United States Patent [19]

Harada

[11] Patent Number: 5,577,896
[45] Date of Patent: Nov. 26, 1996

[54] PUMP

[75] Inventor: Tomoo Harada, Anjo, Japan

[73] Assignee: Nippondenso Co., Ltd., Kariya, Japan

[21] Appl. No.: 265,110

[22] Filed: Jun. 24, 1994

[30] Foreign Application Priority Data

Jun. 25, 1993 [JP] Japan .................................... 5-155368
Apr. 6, 1994 [JP] Japan .................................... 6-068640

[51] Int. Cl.⁶ .................................................... F04B 3/00
[52] U.S. Cl. ........................ 417/259; 417/525; 417/534; 417/546; 417/549; 417/553
[58] Field of Search .................................... 417/244, 254, 417/259–262, 490, 498, 525, 534, 546, 549, 553, 554, 570

[56] References Cited

U.S. PATENT DOCUMENTS

| 176,330 | 4/1876 | Malmquist | 417/553 |
| 759,514 | 5/1904 | Grant | 417/259 |
| 898,659 | 9/1908 | Kuehl | 417/259 |
| 1,653,562 | 12/1927 | Grimley | 417/259 |
| 4,338,066 | 7/1982 | Luker | 417/259 |
| 4,988,147 | 1/1991 | Zirps . | |
| 5,320,498 | 6/1994 | Fuchida | 417/554 |
| 5,395,219 | 3/1995 | Hosoya et al. | 417/554 |

FOREIGN PATENT DOCUMENTS

| 387506 | 9/1990 | European Pat. Off. . |
| 975469 | 11/1961 | Germany . |
| 48-92903 | 12/1973 | Japan . |
| 60-198383 | 10/1985 | Japan . |
| 60-198382 | 10/1985 | Japan . |
| 2253882 | 9/1992 | United Kingdom . |

*Primary Examiner*—Charles G. Freay
*Attorney, Agent, or Firm*—Cushman, Darby & Cushman

[57] ABSTRACT

An object of the present invention is to provide a pump which suppresses a decrease in the volumetric efficiency of the pump to a great extent even in case that the kinematic viscosity of a fluid is high with a compact structure of the pump itself. The present invention, a pump provided with a first pump mechanism and a second pump mechanism comprises a housing having therein a first pump chamber, a second pump chamber, an intake port communicated with the first pump chamber, and a discharge port communicated with the second pump chamber, first valve means which open the communicating passage when the second pump chamber is compressed and close the communicating passage when the second pump chamber is expanded, a piston which expands the second pump chamber when the first pump chamber is compressed, and compresses the second pump chamber when the first pump chamber is expanded in accordance with movement thereof, second valve means which open so as to permit fluid to flow into the first pump chamber when the first pump chamber is expanded and close so as to prevent fluid in the first pump chamber from flowing out of the first pump chamber when the first pump chamber is compressed, and third valve means which open so as to discharge pressurized fluid in the second pump chamber when the second pump chamber is compressed and close when the second pump chamber is expanded.

15 Claims, 22 Drawing Sheets

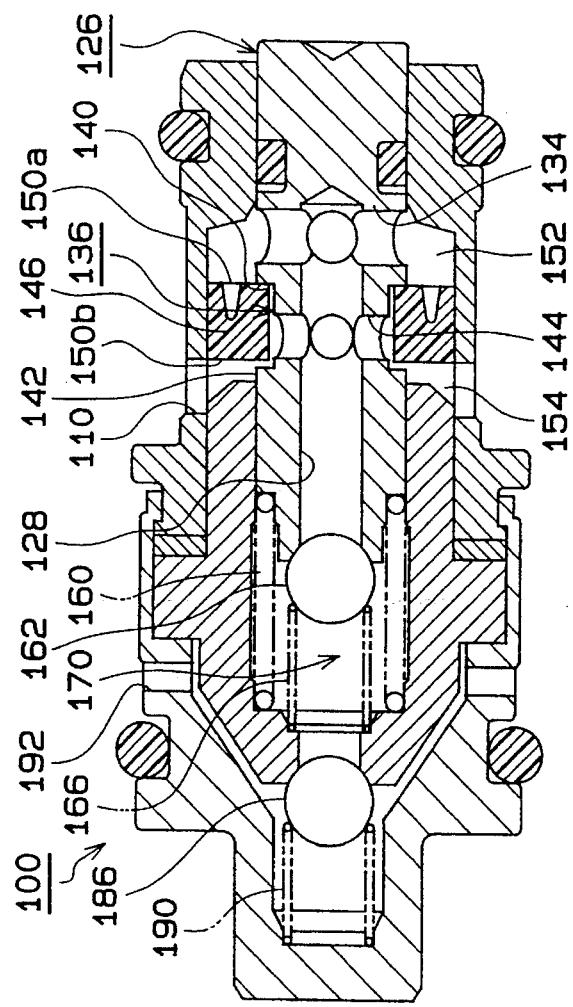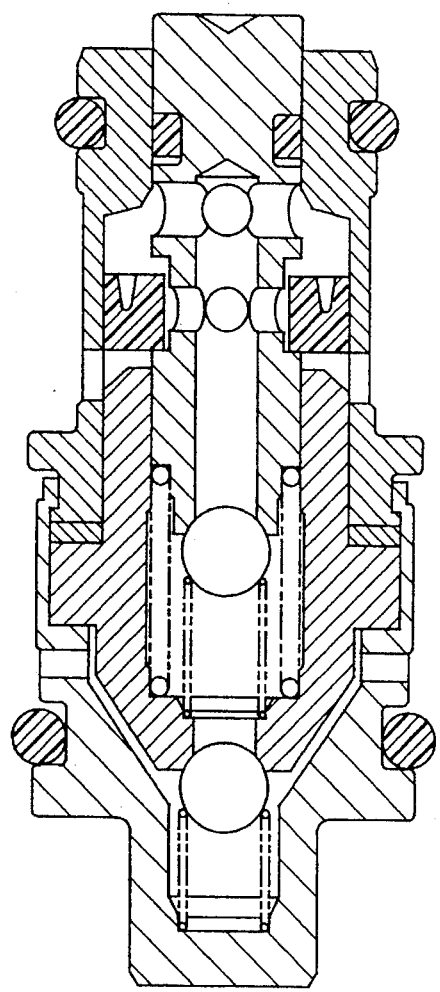
FIG. 3A
FIG. 3B

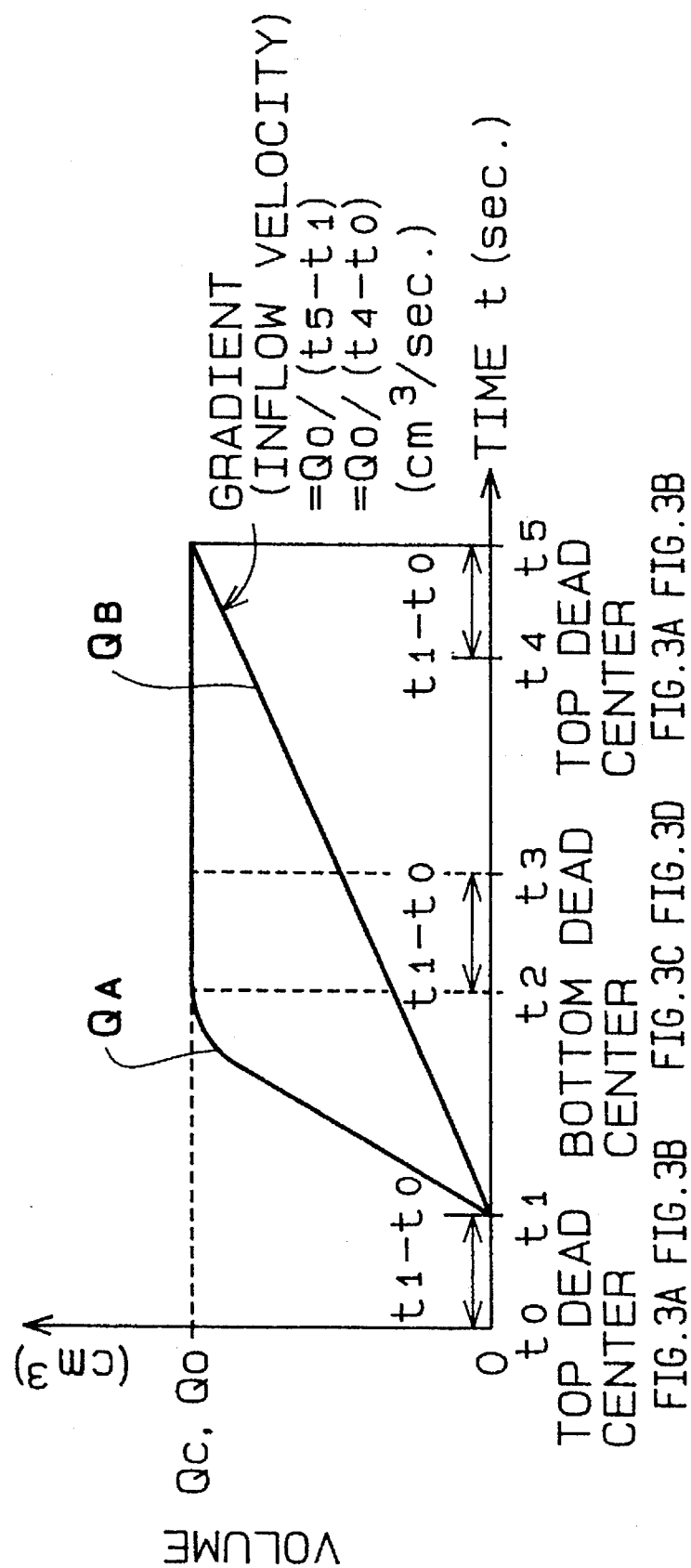

5,577,896

PUMP

BACKGROUND OF THE INVENTION

1. Field of the Invention

The present invention relates to a pump which sucks and discharges fluid, and is preferably applied particularly to a pump for handling fluid with high kinematic viscosity, for example various types of pumps which are mounted on vehicles, particularly a pump used for a hydraulic pump in an anti-lock brake device or traction control device.

2. Description of the Related Art

As shown in FIG. 20, a piston pump 1405 having a structure provided with an intake check valve in which a ball needle 1401 is applied pressure with a spring 1403 is known as a conventional hydraulic pump in an anti-lock brake device for a vehicle. In this piston pump 1405, because the spring force of the spring 1403 acts upon the ball needle 1401, the intake resistance of the intake check valve is high, and the intake was difficult when the kinematic viscosity of the brake oil increased, for example when at low temperature.

In this manner, the conventional piston pump 1405 have the problem with a deterioration of volumetric efficiency in case that the kinematic viscosity of the fluid is high.

That is to say, as shown in FIG. 21, the possible intake volume QA of the conventional piston pump 1405 increases in the suction stroke from top dead center to bottom dead center of the piston, in the decreases and discharge stroke from bottom dead center to top dead center.

In case that the kinematic viscosity of the brake oil is low, because the fluid flows into the pump chamber 1409 while substantially following the increase in the possible intake volume QA in the above suction stroke, the intake quantity of the piston pump 1405 becomes sufficient and no discharge insufficiency occurs. However, if the kinematic viscosity of the brake oil becomes high, for example, low temperature or the like, the inflow speed of the brake oil (fluid) to the pump chamber 1409 declines, and so the inflow quantity QB does not follow the increase in the possible intake volume QA and an inflow delay occurs. Because the possible intake volume QA declines when the piston passes bottom dead center, as described above, the final inflow quantity QC of fluid per cycle of the piston to the pump chamber may fall greatly below the maximum value Q0 (corresponding to bottom dead center) of the possible intake volume QA.

FIG. 21 shows the inflow quantity QB of the fluid in case that the inflow speed is $Q0/(t_4-t_0)$ [cm$^3$/sec.], and the final inflow quantity QC [cm$^3$] is only approximately 69% of the maximum value Q0 [cm$^3$]. In other words, the volumetric efficiency of the pump has declined to approximately 69%.

SUMMARY OF THE INVENTION

Accordingly, an object of the present invention is to provide a pump which suppresses a decrease in the volumetric efficiency of the pump to a great extent even in case that the kinematic viscosity of a fluid is high with a compact structure of the pump itself.

According to the first aspect of the present invention, a pump provided with a first pump mechanism and a second pump mechanism comprises a housing having therein a first pump chamber, a second pump chamber, an intake port communicated with said first pump chamber, and a discharge port communicated with the second pump chamber, first valve means disposed in a communicating passage between the first pump chamber and said second pump chamber, which open the communicating passage when the second pump chamber is compressed and close the communicating passage when the second pump chamber is expanded, a piston reciprocatingly disposed in the housing, which expands the second pump chamber when the first pump chamber is compressed and compresses the second pump chamber when the first pump chamber is expanded in accordance with movement thereof, second valve means disposed near the intake port in the housing, which open so as to permit fluid to flow into the first pump chamber when the first pump chamber is expanded and close so as to prevent fluid in the first pump chamber from flowing out of the first pump chamber when the first pump chamber is compressed, and third valve means disposed near the discharge port in the housing, which open so as to discharge pressurized fluid in the second pump chamber when the second pump chamber is compressed and close when said second pump chamber is expanded.

According to the second aspect of the present invention, as shown in FIG. 1, a pump comprises a first pump mechanism provided with a first pump chamber of variable volume and a first intake port and first discharge port which are communicated with the first pump chamber, and sucking fluid from the first intake port and discharging fluid from the first discharge port in accordance with changes in volume of the first pump chamber, and a second pump mechanism provided with a second pump chamber, a second intake port which is communicated with the second pump chamber, a second discharge port which is communicated with the second pump chamber and the first intake port, and a valve means which is disposed in the second pump chamber, and which forms an intake chamber on the side of the second intake port, forms a discharge chamber on the side of second discharge port, is relatively movable along the axial direction with respect to the second pump chamber in synchronization with changes in volume of the first pump chamber, interrupts communication between the intake chamber and the discharge chamber when moved relatively to the side of the discharge chamber, and communicates the intake chamber and the discharge chamber when moved relatively to the side of the intake chamber, wherein when volume in the first pump chamber is expanded, the valve means relatively moves to the side of the discharge port and fluid is sucked into said intake chamber and fluid is filled with the first pump chamber through the second discharge port and the first intake port, and when volume in the first pump chamber is compressed, fluid is discharged from the first discharge port, the valve means moves relatively to the side of the intake chamber, and fluid flows from the intake chamber to the said discharge chamber.

According to the above configuration, on the side of intake port, a vacuum for absorbing fluid toward intake port is generated since the first pump chamber is closed it is possible to suppress a decrease in the volumetric efficiency of the pump to a great extent even in a case that the kinematic viscosity of a fluid is high, together with enabling a compact structure of the pump itself.

BRIEF DESCRIPTION OF THE DRAWINGS

In the accompanying drawings:

FIGS. 3A to 3D show an operation of the pump of the first embodiment, FIG. 3A shows the condition when the piston is at top dead center, FIG. 3B shows the condition when the piston has lowered slightly from top dead center, FIG. 3C shows the condition when the piston is at bottom dead center, and FIG. 3D shows the condition when the piston has risen slightly from bottom dead center;

FIG. 4 is a graph of the changes in the possible intake volume of the pump of the embodiment;

FIG. 5A shows a fluid circuit used for the experiment, and FIG. 5B is a graph showing results of the experiment;

FIG. 12A is a cross-sectional view, and FIGS. 12B to 12D are external views;

FIG. 16A is a cross-sectional view, and FIGS. 16B to 16D are external views;

DETAILED DESCRIPTION OF THE PREFERRED EMBODIMENTS

Next, an embodiment of the present invention is described with reference to the attached drawings.

Figure 1:
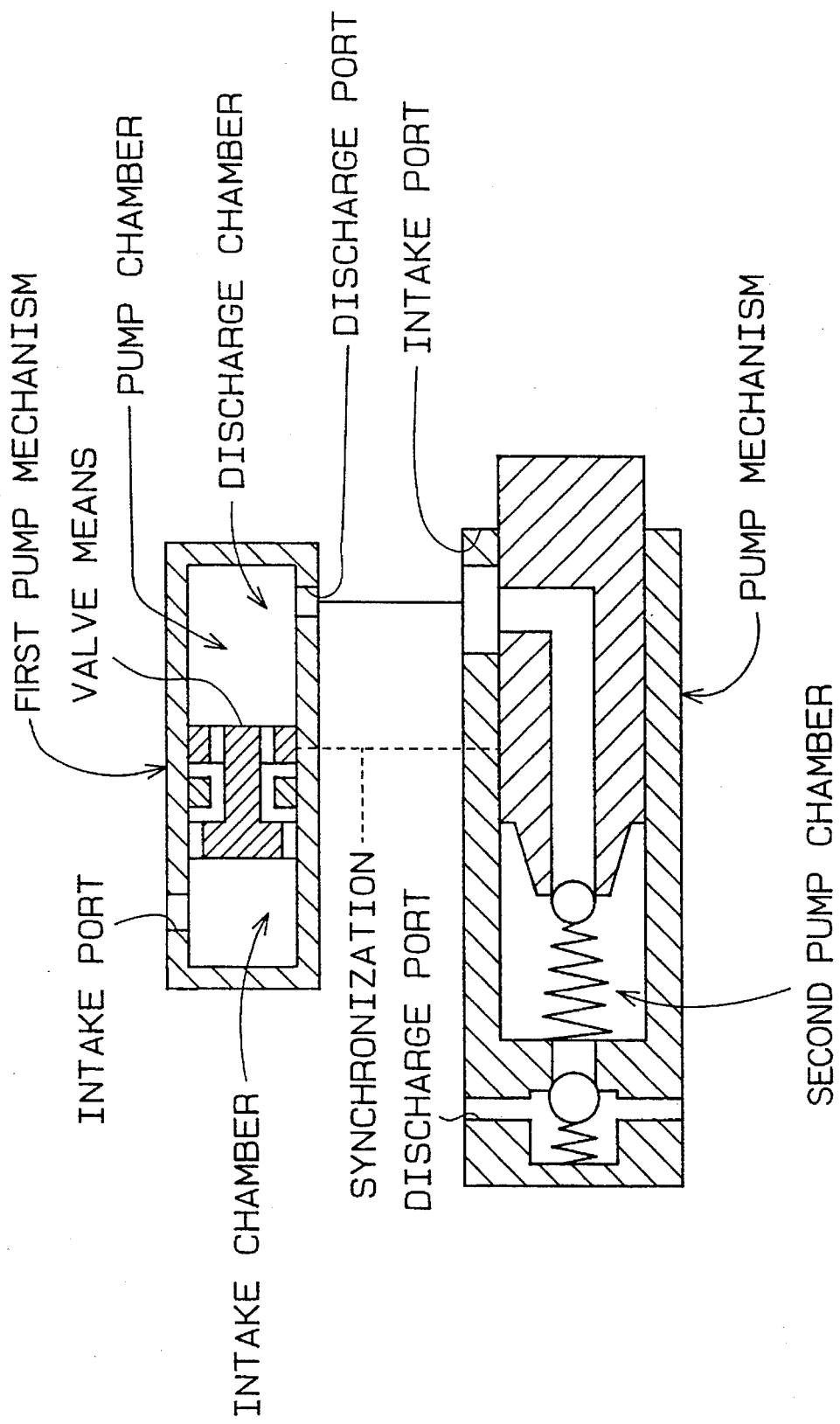
FIG. 1 schematically shows a configuration of the present invention.
Figure 2:
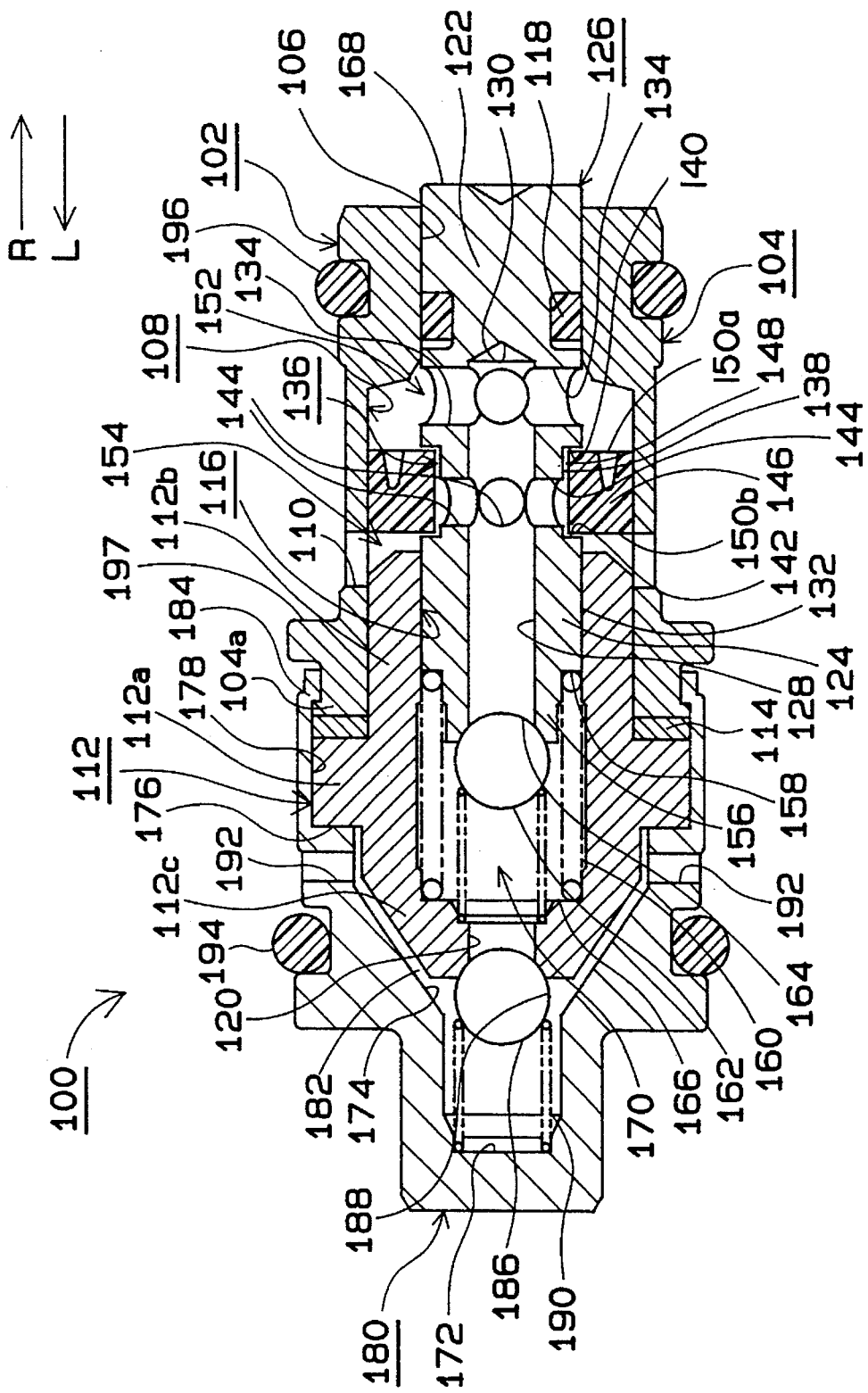
FIG. 2 is a cross sectional view of the first embodiment of the present invention.

As shown in FIG. 2, a piston hole 106, which is open at an end on the side of an arrow R, and a large-diameter hole 108, which is communicated with the piston hole 106 at one end and is open at the other end, are coaxially bored into the first cylinder member 104 forming a portion of an outer shell of the a pump 100 of the embodiment. In addition, a plurality of intake ports 110, which are communicated with the large-diameter hole 108 and are open outside, are bored into the first cylinder member 104 along the radial direction of the large-diameter hole 108.

An inner-fitting end portion 112b of a second cylinder member. 112 having a flange portion 112a extending to near the center, an inner-fitting end portion 112b formed in a cylindrical shape and adjacent to the flange portion 112a, and a truncated-cone portion end 112c formed in a truncated conical shape and positioned on the opposite side of the inner-fitting end portion 112b, is fitted into the large-diameter hole 108, from the fitting end 104a of the first piston member 104 to near an intake port 110. A washer 114 is interposed between the flange portion 112a of the second cylinder member 112 and the fitting end 104a portion of the first cylinder member 104. Additionally, a sliding hole 116 open on the side of the inner-fitting end portion 112b and is substantially identical in axis and diameter with the piston hole 106 of the first piston member 104, and a discharge passage 120 which is communicated with a sliding hole 116 and is open on the side of the truncated-cone end 112c, are bored into the second cylinder member 112.

A piston 126 provided with a first sliding portion 122 slidable in the piston hole 106 and a second sliding section 124 slidable in the sliding hole 116 is reciprocatably inserted in the first cylinder member 104 and second cylinder member 112. In addition, an O-ring 118 for a seal material is interposed between the first sliding portion 122 and the piston hole 106. A center hole 128, which is open at an end on the side of the sliding hole 116 and extends to near the first sliding portion 122, is bored into the piston 126 substantially coaxially with the piston 126. Additionally, four end-communicating holes 134, which are communicated with the center hole 128 near a closed end 130 on the side of the first sliding portion of the center hole 128 and are open to the peripheral surface 132 of the piston 126, are bored into the piston 126 so as to form angles of approximately 90 degrees each other along a radial direction of the piston 126. Furthermore, an annular groove 136 is bored into the piston between the end-communicating holes 134 and the second sliding portion 124, and four groove-communicating holes 144 which are communicated between this groove 136 and the center hole 128 are bored into the piston 126 so as to form angles of approximately 90 degrees each other along the radial direction of the piston 126.

A sliding ring 146 composed of rubber slidably inserted in the large-diameter hole 108 of the first cylinder member 104 is fitted on the groove 136 of the piston 126. The inner diameter of the sliding ring 146 is larger than the outer diameter of the bottom surface 138 portion of the groove 136, and a gap 148 is formed between the sliding ring 146 and the bottom surface 138. In addition, the axial length of the sliding ring 146 is shorter than a clearance between a pair of side walls 140 and 142 of the groove 136, and it is possible to change the relative position along the axial direction of the sliding ring 146 between the sliding ring 146 and groove 136 from a condition where the first end face 150a of the sliding ring 146 which is positioned on the side of the first sliding portion 122 contacts the side wall 140 to a condition where the second end face 150b of the sliding ring 146 which is positioned on the side of the second sliding portion 124 contacts the side wall 142. Moreover, the sliding ring 146 can be moved in the same direction as the piston 126 so that the first end face 150a of the sliding ring 146 is applied pressure by the side wall 140 when the piston 126 is moved in the direction of arrow L or the second end face 150b of the sliding ring 146 is applied pressure by the side wall 142 when the piston 126 is moved in the direction of arrow R.

This sliding ring 146 divides the large-diameter hole 108 into the discharge chamber 152 on the side of the first end face 150a and the intake chamber 154 on the side of the second end face 150b, but such divided condition is not fixed, and the volume of the discharge chamber 152 and the intake chamber 154 vary according to the movement of the sliding ring 146 accompanying the movement of the piston 126 described above. However, when the first end face 150a of the sliding ring 146 is applied pressure by the side wall 140 (i.e., during movement in the direction of arrow L), the intake chamber 154 communicates with the discharge chamber 152 through the groove-communicating holes 144, center hole 128, and end-communicating holes 134, but when the second end face 150b of the sliding ring 146 is applied to by the side wall 142 (i.e., during movement in the direction of arrow R), the communication of the intake chamber 154 and discharge chamber 152 is interrupted.

Because of this, when the sliding ring 146 moves together with the piston 126 in the direction of arrow R, the intake chamber 154 is in a reduced-pressure condition and fluid can be sucked into the intake chamber 154 from the intake port 110, and the discharge chamber 152 is in a pressurized condition and fluid can be discharged from the discharge chamber 152 to the side of the center hole 128 side through the end-communicating holes 134 and the groove-communicating holes 144. On the other hand, when the sliding ring 146 moves together with the piston 126 in the direction of arrow L, the volume of the intake chamber 154 decreases and the volume of the discharge chamber 152 increases, but because the intake chamber 154 communicates with the discharge chamber 152 through the groove-communicating holes 144, center hole 128, and end-communicating holes 134, fluid can be moved from the side of the intake chamber 154 to the side of the discharge chamber 152. That is to say, the piston 126 and sliding ring 146 constitute valve means.

The inner end 156 of the piston 126 positioned in the sliding hole 116 has a smaller outer diameter than the second sliding portion 124, and a step portion 158 is formed at the portion of connection of the inner end 156 and the second sliding portion 124. A compression spring 160 which is substantially coaxial with the piston 126 is interposed between this step portion 158 and the second cylinder member 112, and apply pressure to the piston 126 in the direction of arrow R. In addition, the opening of the center hole 128 on the side of the inner end 156 is sealed with a ball needle 162 and provided with a contactable valve seat 164 formed in a spherical shape. A compression spring 166 which is substantially coaxial with the piston 126 is interposed between the ball needle 162 which contacts this valve seat 164 and the second cylinder member 112, and the compression spring 166 apply pressure to the ball needle 162 in the direction of arrow R. Because of this, the ball needle 162 is usually seated in the valve seat 164, but when the applying pressure force of the ball needle 162 from the side of the center hole 128 overcome the applying pressure force of the compression spring 166, the ball needle 162 is apart from the valve seat 164.

Meanwhile, the outer end face 168 of the piston 126 is in contact with an eccentric cam (not shown), and the piston 126 is driven by the rotation of the eccentric cam in the direction of arrow L in resistance to the applying pressure of the compression spring 160. Consequently, when the eccentric cam is rotated, the piston 126 is reciprocatingly driven in the directions of arrows R and L by the eccentric cam and the compression spring 160. Also, when the ball needle 162 is seated in the valve seat 164, the piston 126 is also applied pressure by the pressure force of the compression spring 166 via the ball needle 162, and in this case, the piston 126 is driven in the direction of arrow L in resistance to the composite applying pressure force of the compression spring 160 and compression spring 166. Volume varies according to the reciprocating motion of the piston 126 driven by this eccentric cam and compression springs 160 and 166, the space in the sliding hole 116 becomes the pump chamber 170, and when the volume of the pump chamber 170 increases, fluid can be sucked into the pump chamber 170 from the side of the center hole 128.

However, from the flange portion 112a of the second cylinder member 112 to the fitting end portion 104a of the first cylinder member 104, a spring case 180 into which is bored a spring-holding hole 172 which is closed at one end, a funnel-shaped portion 174 which is communicated with this spring-holding hole 172 and which has a shape that is virtually in conformity with the truncated-cone end 112c of the second cylinder member 112, and a fitting hole 178 which is connected to the funnel-shaped portion 174 via a step portion 176 and is open at the other end, is fitted between the funnel-shaped portion 174 and the truncated-cone end 112c so as to keep a clearance 182. The end portion 184 on the fitting hole 178 side of this spring case 180 is caulked along the direction in which diameter is reduced. By means of this caulking and the step portion 176, the fitting end of the first cylinder member 104, washer 114, and flange portion 112a of the second cylinder member 112 are sealed watertightly with respect to each other, and by means of this the first cylinder member 104, second cylinder member 112, and spring case 180 are integrally connected, and the first cylinder member 104 and spring case 180 form the outer shell 102.

In addition, a ball needle 186 is sealed into the opening of the discharge passage 120 which is bored into the second cylinder member 112 and provided with contactable valve seat 188 formed in a spherical shape. Between the ball needle 186 which contacts this valve seat 188 and the spring case 180 is interposed a compression spring 190 which is inserted within the spring-holding hole 172 substantially coaxially with the discharge passage 120, and the compression spring 190 applies the pressure to the ball needle 186 in the direction of arrow R. Because of this, the ball needle 186 is seated in the valve seat 188, but when the applying pressure force to the valve needle 186 from the side of discharge passage 120 overcomes the applying pressure force of the compression spring 190, the ball needle 186 is apart from the valve seat 188. Furthermore, a pair of discharge ports 192 which are communicated with the clearance 182 and open to the outside of the spring case 180 are bored into the spring case at opposing positions each other along the direction of the diameter of the spring case 180. Because of this, when the piston 126 moves in the direction so as to reduce the volume of the pump chamber 170, the fluid in the pump chamber 170 is pressurized and lifts the ball needle 186, and the flow of fluid from the pump chamber 170 to the discharge ports 192 can be discharged.

Moreover, the casing and pump 100 are watertightly sealed with the O-ring portion 196 fitted around the end portion of the first cylinder member 104, the end face portion 197 sealed with the casing, and the O-ring portion 194 fitted around the center of the spring case 180, and the portion forming a space between the casing and the pump 100 corresponding to the portion from the O-ring 196 to the end face 197 is taken to be the intake path (second intake port), and the portion forming a space formed between the casing and the pump 100 corresponding to the portion from the O-ring 194 to the end face 197 is taken to be the discharge path (first discharge port).

Next, the operation of this pump 100 is described with reference to FIG. 3 and FIG. 4. The reference numerals of the main portions are only indicated in FIG. 3A, but the reference numerals are completely omitted in FIGS. 3B to 3D.

(First Stroke)

First, FIG. 3A shows the condition of the pump 100 when the piston 126 has reached top dead center. In this condition, the volume of the pump chamber 170 is at a minimum, and it corresponds to the condition where the discharge of fluid from the pump chamber 170 to the side of the discharge port 192 has been completed. In addition, the sliding ring 146 makes the first end face 150a be in contact with the side wall 140 of the groove 136, and the intake chamber 154 and discharge chamber 152 are communicated.

Next, the piston 126 receiving the applying pressure force of the compression spring 160 moves from the position shown in FIG. 3A toward bottom dead center (the movement in this direction is hereinafter referred to as "lowering") in accordance with the rotation of the eccentric cam. The volume of the pump chamber 170 increases in accordance with the lowering of the piston 126, and the pump chamber 170 is in the reduced-pressure condition.

FIG. 3B shows the condition when the piston 126 has been lowered from top dead center by a distance corresponding to the difference in the axial length between the groove 136 and sliding ring 146, and the side wall 142 of the groove 136 is in contact with the second end face 150b of the sliding ring 146. In this condition, the communication between the intake chamber 154 and the discharge chamber 152 is interrupted by the contact of the side wall 142 and second end face 150b, and the discharge chamber 152 is communicated only with the side of the center hole 128.

Figure 3C:
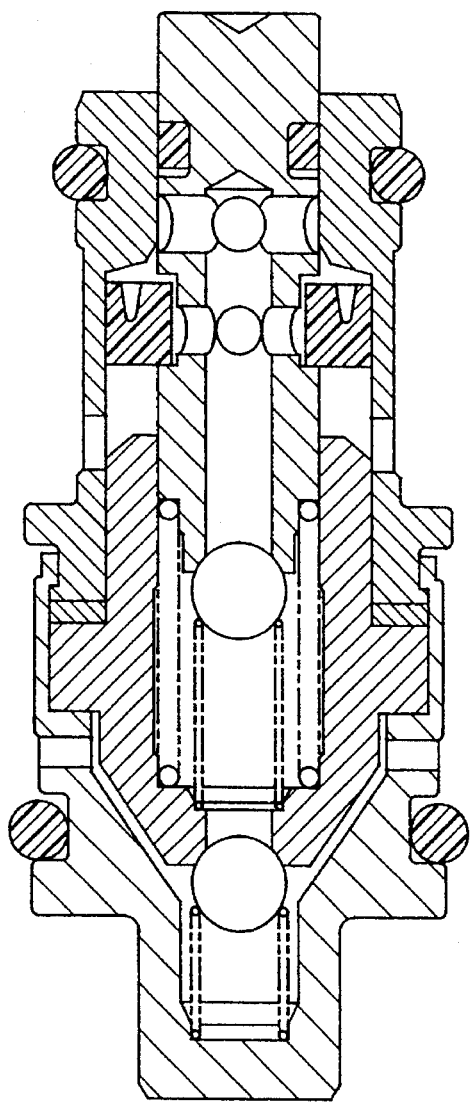

Furthermore, the piston 126 continues to be lowered from the condition shown in FIG. 3B to reach bottom dead center (refer to FIG. 3C). During this lowering of the piston 126, the sliding ring 146 is applied pressure by the side wall 142 of the groove 136 and moves in the same direction as the piston 126. Because the volume of the intake chamber 154 increases in accordance with the movement of the sliding ring 146 and is in a reduced-pressure condition, an amount of fluid corresponding to the increase of volume of the intake port 154 is sucked into the intake chamber 154 from the intake port 110. At this time, because the volume of the discharge chamber 152 decreases and is in a pressurized condition, fluid is discharged from the discharge chamber 152 to the side of the center hole 128 through the end-communicating holes 134 and groove-communicating holes 144. The fluid discharged to the side of the center hole 128 resists the applying pressure force of the compression spring 166 and lifts the ball needle 162, and flows into the pump chamber 170.

In this manner, the intake of fluid from the intake port 110 to the intake chamber 154, the discharge of fluid from the discharge chamber 152 to the side of the center hole 128, and the filling of fluid to the pump chamber 170 are performed in parallel in the first stroke.

(Second Stroke)

The piston 126, which has reached bottom dead center, continues to move toward top dead center (the movement in this direction is hereinafter referred to as "rising").

Figure 3D:
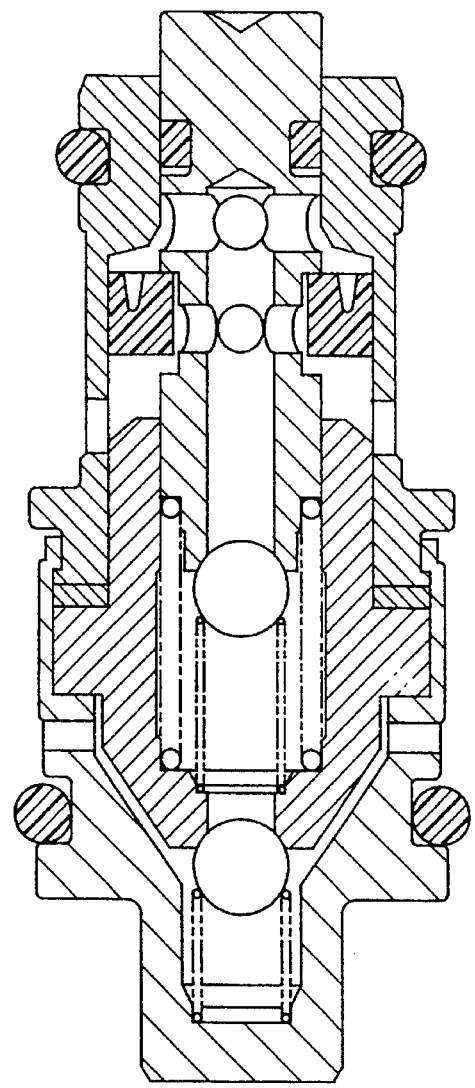

FIG. 3D shows the condition where the piston 126 has risen from bottom dead center by a distance corresponding to the difference in the axial lengths between the groove 136 and sliding ring 146, and the side wall 140 of the groove 136 is in contact with the first end face 150a of the sliding ring 146. In this condition, the intake chamber 154 and discharge chamber 152 are in communication through the groove-communicating holes 144, center hole 128, and end-communicating holes 134.

Furthermore, the piston 126 continues to rise from the condition shown in FIG. 3D to reach top dead center (refer to FIG. 3A). During this rising of the piston 126, the sliding ring 146 is applied pressure by the side wall 140 of the groove 136 and moves in the same direction as the piston 126. In accordance with this movement of the sliding ring 146, the volume of the intake chamber 154 decreases and the volume of the discharge chamber 152 increases. Because the intake chamber 154 and discharge chamber 152 are communicated, fluid flows from the intake chamber 154 to the discharge chamber 152 according to the amount of increase in the volume of the discharge chamber 152.

In addition, the volume of the pump chamber 170 decreases in accordance with this rising of the piston 126, but because the discharge of fluid from the discharge chamber 152 is stopped, the applying pressure force which lifts the ball needle 162 is decreased, and the ball needle 162 is seated in the valve seat 164. Because of this, communication between the side of the center hole 128 and the pump chamber 170 is interrupted, and the pump chamber 170 is in a pressurized condition in accordance with the decrease in its volume. For this reason, the fluid in the pump chamber 170 in which the pressure has risen resists the applying force of the compression spring 190 to lift the ball needle 186, flows outside the pump chamber 170, and is discharged from the discharge port 192.

In this manner, the intake of fluid from the intake chamber 154 to the discharge chamber 152 and the discharge of fluid from the pump chamber 170 to the discharge port 192 are performed in parallel in the second stroke.

As described the above, the pump 100 sucks fluid in accordance with the increase of volume of the intake chamber 154 in the first stroke. That is to say, the pump 100 can suck a volume of fluid which corresponds maximally to the amount of increase in volume of the intake chamber 154. Therefore, this amount of increase in volume of the intake chamber 154 becomes the possible volume QA of fluid which sucked to the pump 100 (hereinafter referred to as "possible intake volume").

As shown in FIG. 4, the possible intake volume QA of the pump 100 in the first stroke gradually increases from the time ($t_1$) corresponding to FIG. 3B to the time ($t_2$) corresponding to FIG. 3C, and the maximum value Q0 of the possible intake volume QA is when the piston 126 is at bottom dead center ($t_2$).

When the piston 126 passes bottom dead center and the second stroke begins, the volume of the intake chamber 154 decreases according to the movement of the sliding ring 146 to the side of the intake chamber 154, the volume increases in correspondence to the amount of decrease in volume of the intake chamber 154 on the back pressure side of the sliding ring 146 (which is equivalent to the side of the discharge chamber 152).

As described the above, because the ball needle 162 is seated in the valve seat 164 in the second stroke, the space from the intake port 110 to the center hole 128 is not communicated with a portion other than the intake port 110. In addition, the side of the intake chamber 154 and the side of the discharge chamber 152 are communicated.

Consequently, in the space from the intake port 110 to the center hole 128, the volume of the intake chamber 154 decreases and the volume of the discharge chamber 152 increases, sandwiching the sliding ring 146, but no change is observed in the volume of the entirety of this space. That is to say, the possible intake volume QA of the pump 100, which becomes the maximum value Q0 at bottom dead center of the piston 126, is maintained in the space from the intake port 110 to the center hole 128 ($t_2$ to $t_3$ to $t_4$ to $t_5$).

In this manner, the possible intake volume QA of the pump 100, which gradually increases in the first stroke and becomes the maximum value Q0 at the time ($t_2$) that the piston 126 reaches bottom dead center, is maintained throughout the second stroke, until the time ($t_5$, FIG. 3B) when the communication of the intake chamber 154 and discharge chamber 152 is interrupted in the next cycle. For this reason, the volumetric efficiency of the pump 100 does not drop, even in cases such as shown in FIG. 4.

For example, in case that the kinematic viscosity of the fluid is high, a delay may occur in the intake of the fluid relative to the increase in volume of the intake chamber 154 in the first stroke. In this case, a reduced-pressure area in which fluid is absent is formed in the intake chamber 154 at the time of completion of the first stroke. This reduced-pressure area of the intake chamber 154 is gradually eliminated by the movement of the sliding ring 146 toward the intake chamber 154 in the next second stroke, but in accordance with the movement of the sliding ring 146, a new reduced-pressure area in which fluid is absent is newly formed on the back pressure side of the sliding ring 146 (which is equivalent to the discharge chamber 152). That is to say, in accordance with the movement of the sliding ring 146, the reduced-pressure area on the side of the intake chamber 154 disappears, and a new reduced-pressure area corresponding to this is formed on side of the discharge chamber 152. In the second stroke, the discharge chamber 152 is communicated with the intake port 110 through the intake chamber 154, which is communicated with the discharge chamber 152, and so fluid continues to flow from the intake port 110 to the side of the discharge chamber 152 until the reduced-pressure area on the discharge chamber 152 side is eliminated. FIG. 4 shows the changes across time of the inflow quantity QB of fluid to the pump 100. Even in the case when the influx quantity QB [cm$^3$] of fluid occurs only at an inflow speed of $Q0/(t_5-t_1)=Q0/(t_4-t_0)$ [cm$^3$/sec.], the final inflow quantity is able to reach as high as the maximum value Q0, and the volumetric efficiency of the pump 110 does not decline. On the contrary to this, in the prior art, as shown in FIG. 4B, the possible intake volume QA decreases even with inflow at the same inflow speed ($Q0/(t_4-t_0)$ [cm$^3$/sec.]), and therefore the final inflow quantity QC can only attain approximately 69% of the maximum value Q0, and the volumetric efficiency of the pump declines.

As the above, according to the embodiment of the present invention, the intake of fluid is continued from the first stroke through the second stroke in this manner, the intake efficiency of fluid to the pump is more resistant to decrease than the prior art, even in cases where the kinematic viscosity of the fluid is high. Consequently, the volumetric efficiency of the pump 100 is resistant to decrease even when the kinematic viscosity of the fluid is high.

(Experiment)

Figure 5A:
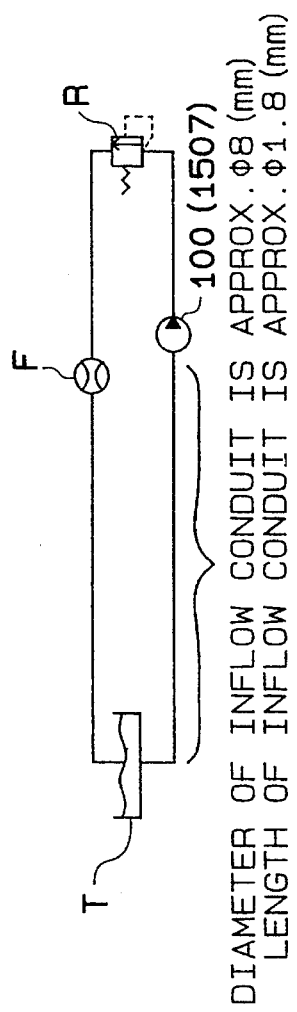
FIGS. 5A and 5B show an experiment of flow measurement of the pump of the first embodiment.
Figure 5B:
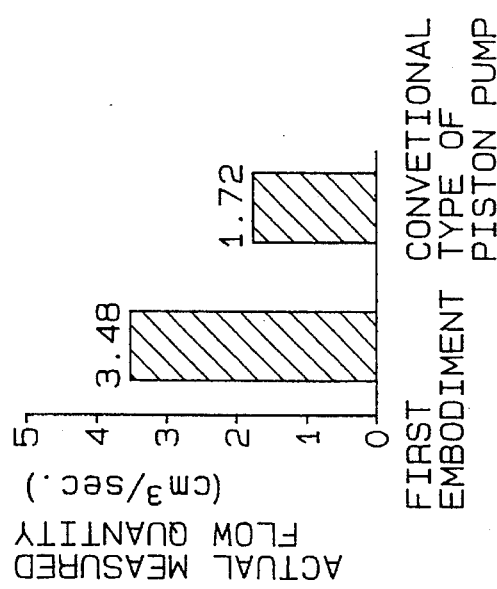
Figure 22:
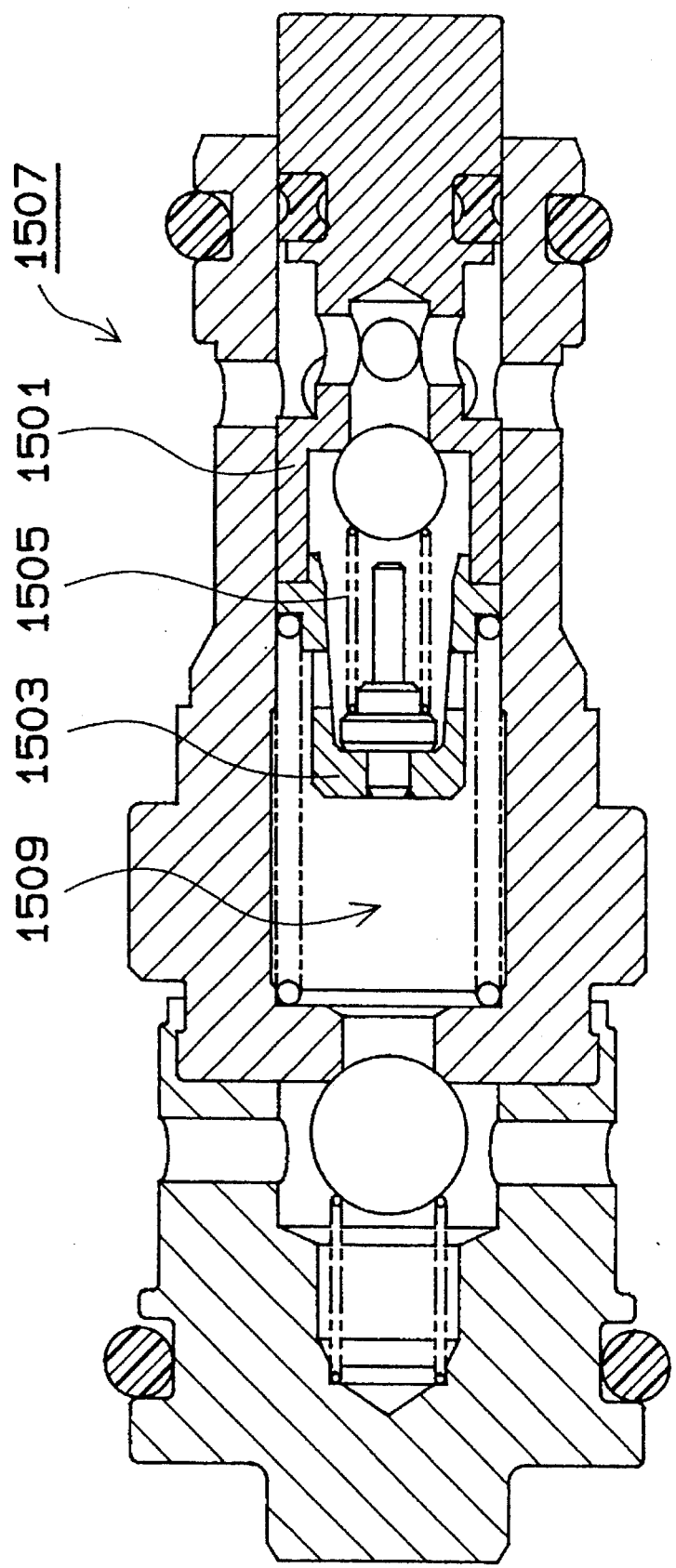
FIG. 22 is a cross sectional view of another piston pump of the prior art.

The pump of the above first embodiment and the conventional piston pump 1507 shown in FIG. 22 were respectively installed in a circuit provided with a reservoir tank T, relief valve R, and flowmeter, as shown in FIG. 5A, and an experiment of flow measurement was carried out using brake oil (kinematic viscosity 350×10$^{-6}$ [m$^2$/sec.]) at a temperature of approximately −30° C. A respective geometric amount of displacement quantity of the pump 100 and the conventional type of piston pump 1500 used for the experiment was 4.58 [cm$^3$/sec.]. Table 1 shows the results of the experiment and FIG. 5B is a graph showing the results of the experiment shown in FIG. 5A.

TABLE 1

|  | Pump in the first embodiment | Conventional type of piston pump |
|---|---|---|
| Geometric amount of displacement quantity [cm$^3$/second] | 4.58 | 4.58 |
| Actual measured quantity [cm$^3$/second] | 3.48 | 1.72 |

As is apparent from Table 1, it can be understood that the pump 100 in the first embodiment had a small drop in volumetric efficiency even with a fluid of high kinematic viscosity, and that intake and discharge capacity are superior to the conventional type of piston pump.

Examples of determination for five dimensions which determine the geometric amounts of fluid movement of the pump in the first embodiment is described. The five dimensions are the $d_1$, $d_2$, $d_3$, l, and $l_s$ indicated following, and the geometric amounts of fluid movement $Q_1$, $Q_2$, and $Q_3$ which are shown in Table 2 are determined by these dimensions.

$d_1$ [cm]: Inner diameter of the sliding hole 116 of the second cylinder member 112 (diameter dimension)

$d_2$ [cm]: Inner diameter of the large-diameter hole 108 of the first cylinder member 104 (diameter dimension)

$d_3$ [cm]: Inner diameter of the piston hole 106 of the first cylinder member 104 (diameter dimension)

l [cm]: Length of the stroke of the piston 126 from top dead center to bottom dead center $l_s$ [cm]: Difference between the axial length $l_1$ between the pair of side walls 140 and 142 of the annular groove 136 of the piston and the axial length $l_2$ of the sliding ring 146 ($l_1-l_2$)

TABLE 2

|  | Geometric discharge quantity per one cycle [cm$^3$] | Geometric intake quantity per one cycle [cm$^3$] |
|---|---|---|
| Second pump mechanism | $Q_1 = \frac{\pi}{4} d_1^2 l$ (Pump chamber 170) | $Q_1 = \frac{\pi}{4} d_1^2 l$ (Pump chamber 170) |
| First pump mechanism | $Q_1 = \frac{\pi}{4} (d_2^2 - d_3^2) \times (l - l_s)$ (Discharge chamber 152) | $Q_1 = \frac{\pi}{4} (d_2^2 - d_1^2) \times (l - l_s)$ (Intake chamber 154) |

For setting $d_1$, $d_2$, $d_3$, l, and $l_s$ as $Q_1$ is determined first based on the pump's demanded performance, specifications, and so on, $d_1$ and l are set so as to satisfy the formula expressing $Q_1$ in the Table 2. Various settings are possible for the remaining $d_2$, $d_3$, and $l_s$, and examples of their settings are shown in Table 3.

TABLE 3

| Setting dimension | $d_3$ ($d_3$ is set so as to be satisfied with the following formula) | $d_2, l_s$ ($d_2, l_s$ are set so as to be satisified with the following formula) |
|---|---|---|
| Setting example 1 | $d_3 = d_1$ | $Q_2 = Q_1$ |
| Setting example 2 | $d_3 = d_1$ | $Q_2 > Q_1$ |
| Setting example 3 | $d_3 = d_1$ | $Q_2 < Q_1$ |
| Setting example 4 | $d_3 > d_1$ | $Q_2 = Q_1$ |
| Setting example 5 | $d_3 > d_1$ | $Q_2 > Q_1$ |

TABLE 3-continued

| Setting dimension | $d_3$ ($d_3$ is set so as to be satisfied with the following formula) | $d_2$, $l_s$ ($d_2$, $l_s$ are set so as to be satisified with the following formula) |
|---|---|---|
| Setting example 6 | $d_3 > d_1$ | $Q_2 < Q_1$ |
| Setting example 7 | $d_3 < d_1$ | $Q_2 = Q_1$ |
| Setting example 8 | $d_3 < d_1$ | $Q_2 > Q_1$ |
| Setting example 9 | $d_3 < d_1$ | $Q_2 < Q_1$ |

As an effect in the setting examples 2, 5, and 8, where $Q_2 > Q_1$, the time from the piston 126 passing bottom dead center until the pressure of the pump chamber 170 rises is shortened, and the volumetric efficiency of the pump 100 is improved. Further, as the pressure of the pump chamber 170 rises at a time when the movement speed of the piston 126 is small, vibration and noise generated by the pump 100 is reduced. With regard to amounts ($Q_2-Q_1$) that attempt to fill the pump chamber 170 excessively, there are a method of absorption by means of elastic deformation of the sliding ring 146 and leaking from the outer peripheral portion of the sliding ring 146 and the side wall 142, and so on. Additionally, as an effect in the setting examples 3, 6, and 9, where $Q_2 < Q_1$, the amount of elastic deformation of the sliding ring 146 is reduced because there is no excessive filling of the pump chamber 170, and so there is the effect of extending the life period of the sliding ring 146.

(Second embodiment)

Figure 6:
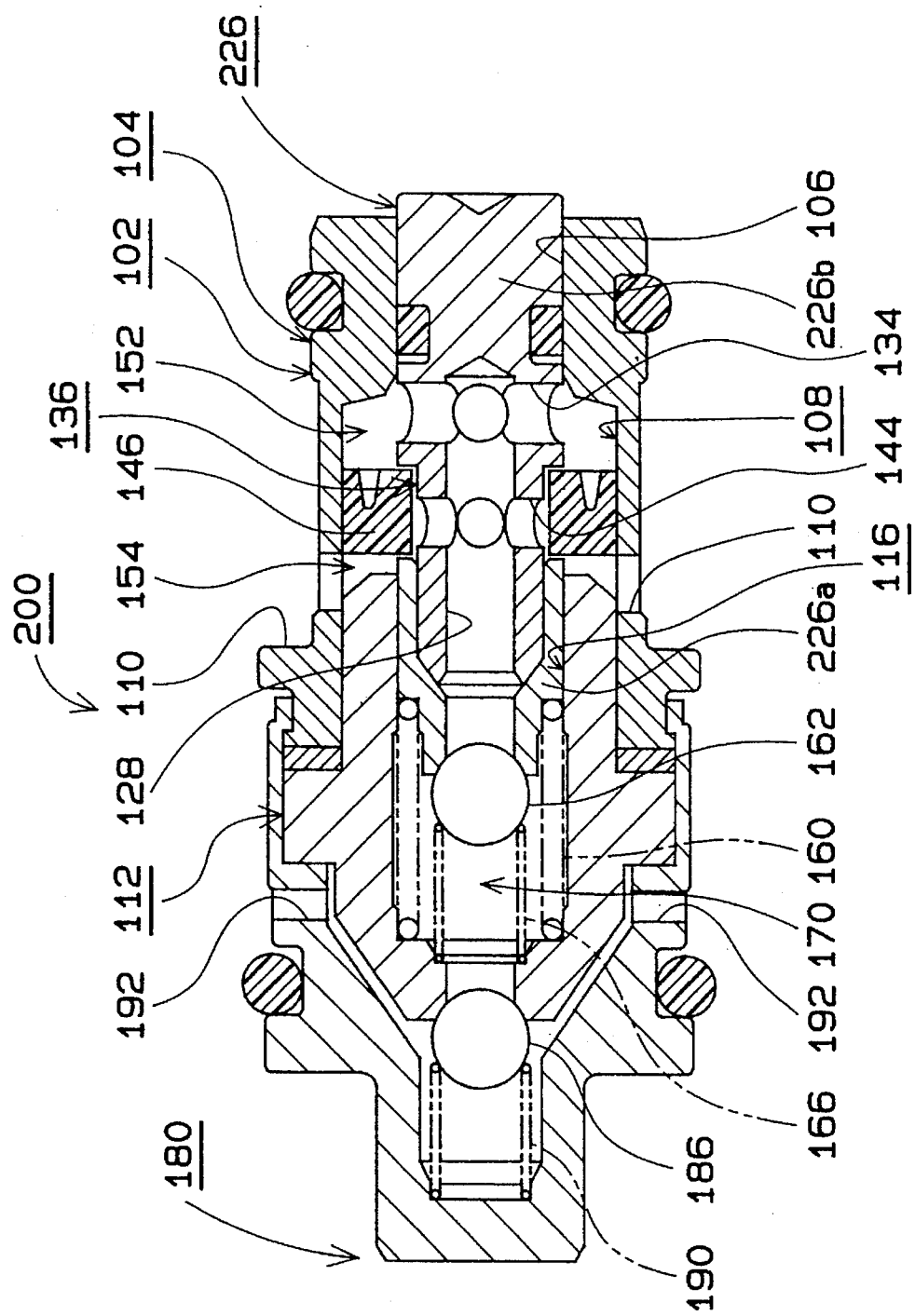
FIG. 6 is a cross-sectional view showing an second embodiment.

As shown in FIG. 6, a pump 200 in this embodiment is an example wherein a piston 226 comprises a first piston member 226a on the side of a pump chamber 170 and a second piston member 226b on an end side driven by an eccentric cam. As the structure is identical in the other respects to the first embodiment, the same reference numerals of the first embodiment are provided for the main portions, and the detailed description is omitted. Additionally, the operation of this pump 200 is identical to that of the first embodiment, and thereby the same effects being obtained.

However, because the piston 226 is comprised of a first piston member 226a and a second piston member 226b, when passing the piston 226 through the sliding ring 146 during the assembly of the pump 200, for example, it is possible to fit the sliding ring 146 on around the second piston member 226b, then connect the first piston member 226a and the second piston member 226b. Consequently, as it becomes unnecessary to elastically deform the sliding ring 146 when passing the piston 226 through the sliding ring 146, the probability of damage to the sliding ring 146 during the assembly is reduced, and the yield is improved.

Figure 7:
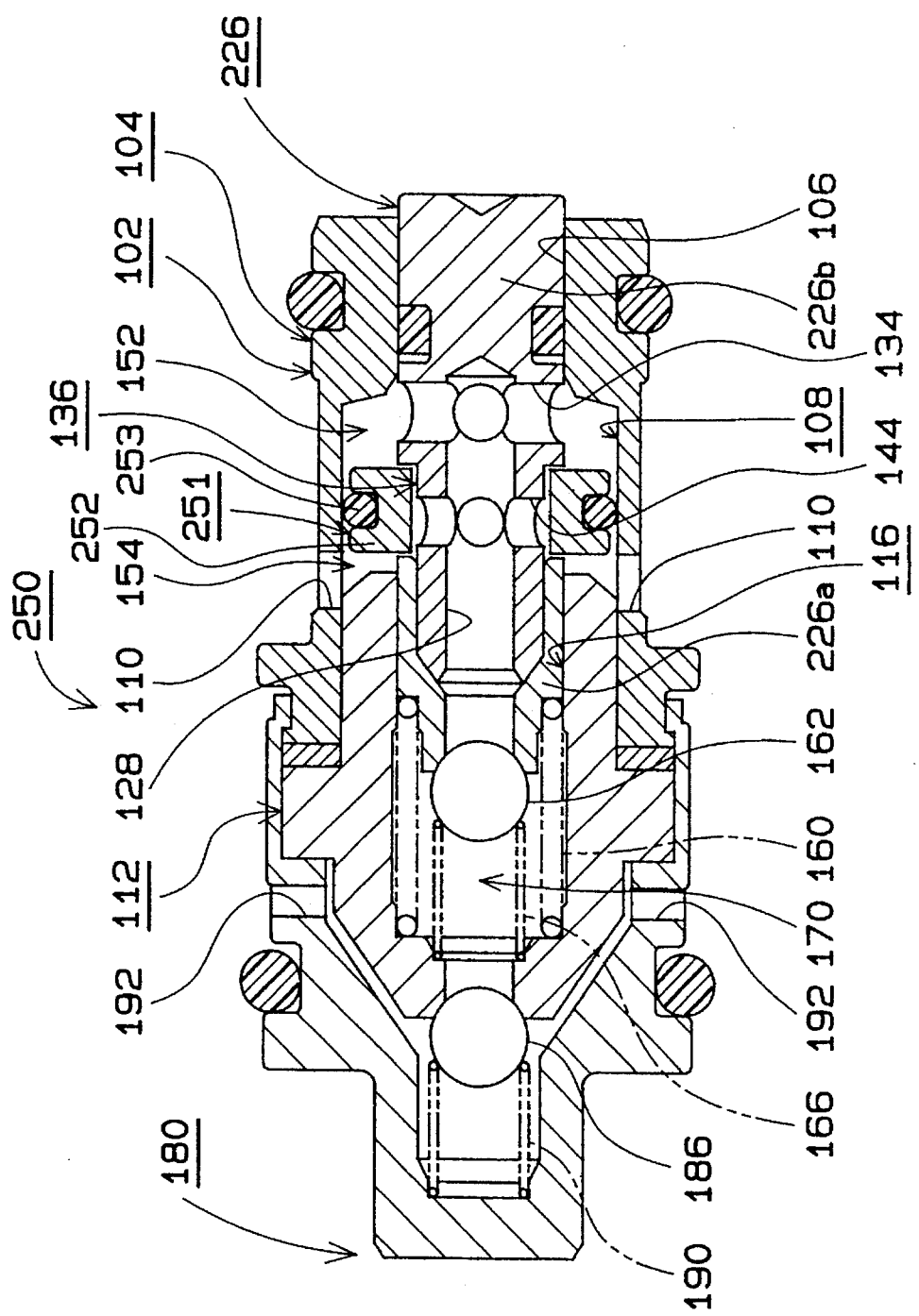
FIG. 7 is a cross sectional view showing a modification of the second embodiment.

In addition, as shown in FIG. 7, as the pump 250 of this embodiment can be assembled even when a nonelastic material is employed as the sliding ring, the life period can be extended by employing a sliding ring 251 in which a nonelastic ring 252 and O-ring 253 are combined. Except for the ring 251, the structure is identical to that of FIG. 6, and operation and effects are identical to the first embodiment.

(Third embodiment)

Figure 8:
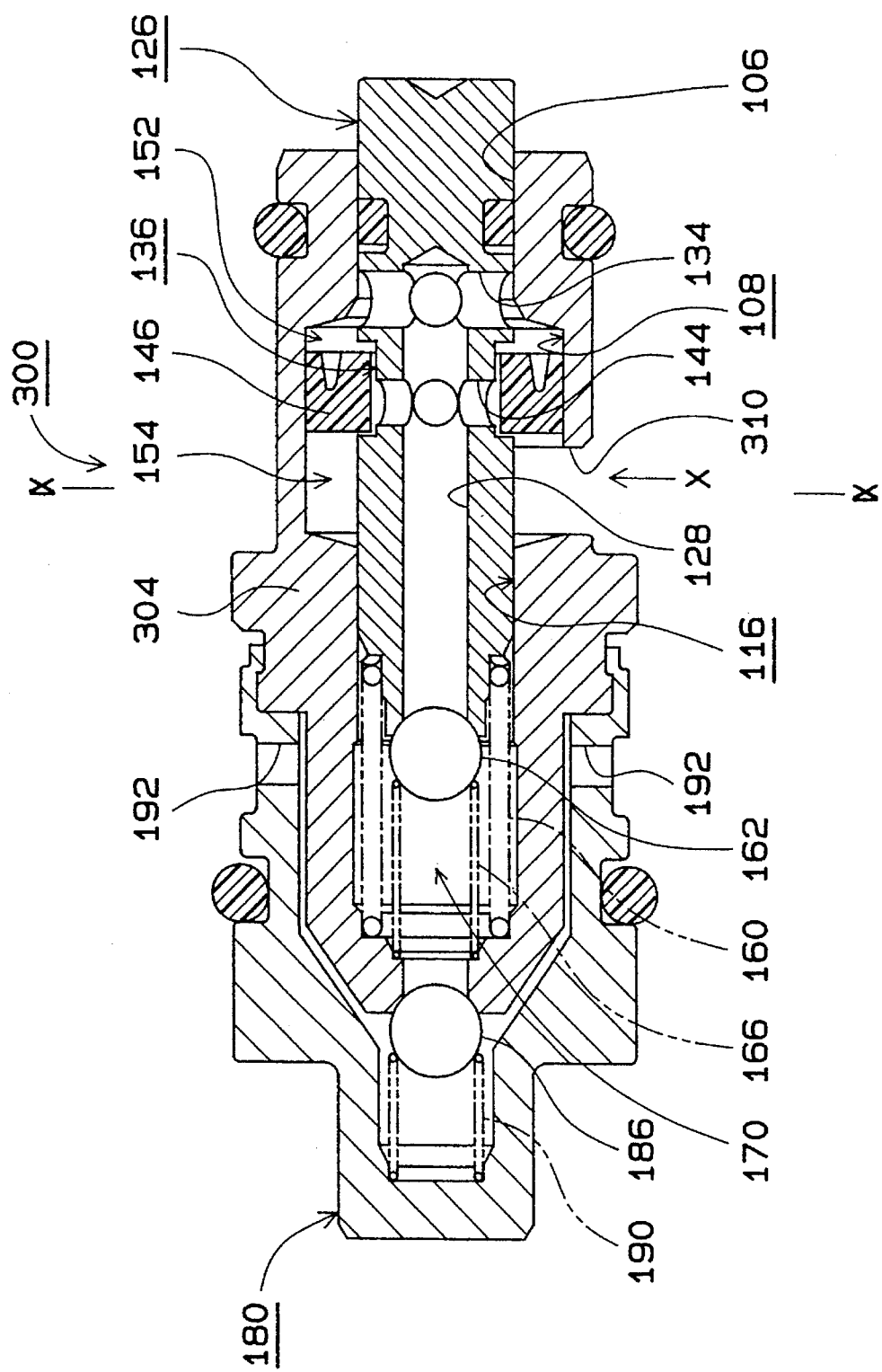
FIG. 8 is a cross sectional view showing a third embodiment.
Figure 9:
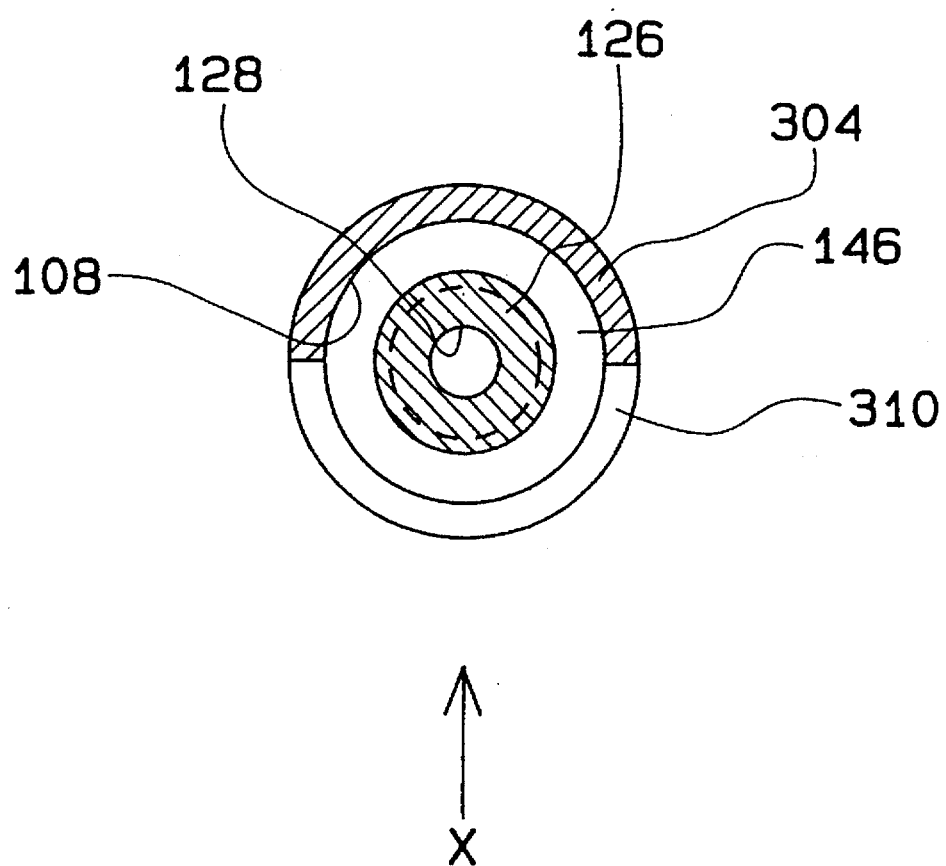
FIG. 9 is a cross sectional view taken along the line IX—IX of FIG. 8.

As shown in FIGS. 8 and 9, a pump 300 in this embodiment is an example wherein the cylinder 304 is a single unit, and an intake port 310 is formed by a crescent-shaped cutaway in the outer periphery of the cylinder 304. As the structure is identical in other respects to the first embodiment, the same reference numerals of the first embodiment is provided for the main portions, and the detailed description is omitted. Additionally, the operation of this pump 300 is identical to that of the first embodiment, and the effects thereby obtained are also identical.

However, because the intake port 310 has the above configuration, during assembly of the pump 300, the sliding ring 146 is first inserted from the intake port 310 into the large-diameter hole 108 along the direction of arrow X. After this, the piston 126 is inserted from the piston hole 106 and inserted through to the sliding hole 116 while enlarging the inner diameter of the sliding ring 146 so as to achieve the shown condition. When the cylinder 304 is composed of a single part in this manner, the precision of the coaxiality of the sliding hole 116 of the cylinder 304 and the piston hole 106 can be improved, thereby the discharge performance being improved as well as the life period being extended.

(Fourth embodiment)

This embodiment differs from the first to the third embodiments in a respect that the intake chamber is provided on the side of the outer surface of the cylinder.

Figure 10:
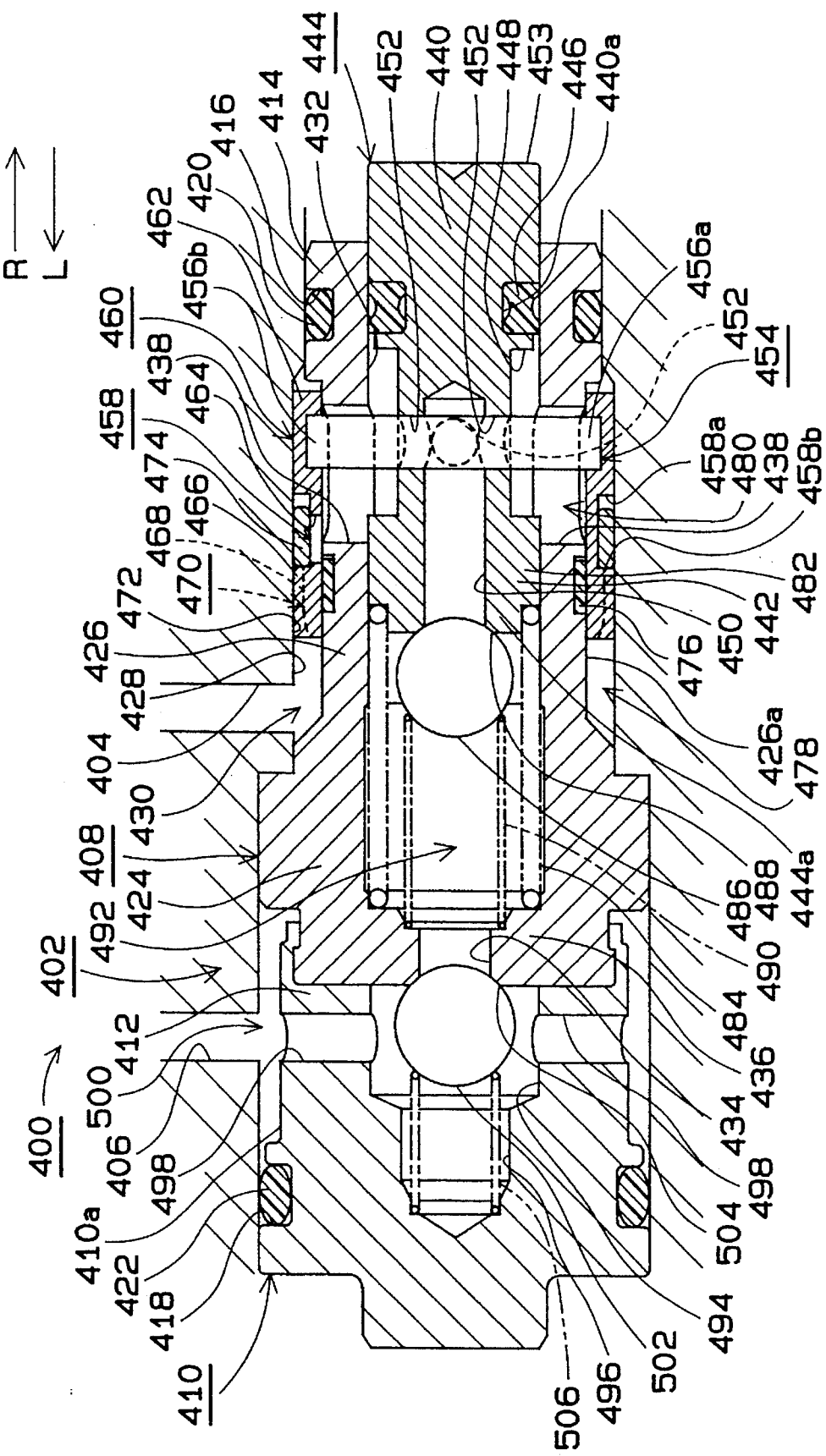
FIG. 10 is a cross sectional view showing a fourth embodiment.

As shown in FIG. 10, an intake path 404 for the intake of fluid and a discharge path 406 for discharge are provided on the casing 402 of the pump 400. A cylinder 408 and a spring case 410 are contained substantially coaxially in the casing 402, and the cylinder 408 and spring case 410 are caulked at a caulked portion 412 of the spring case 410 and thereby secured each other. A ring groove 416 provided on the outer end portion 414 which is apart from the caulked portion 412 of the cylinder 408 and a ring groove 418 provided on the side which is apart from the caulked portion 412 of the spring case 410 are fitted respectively with O-rings 420 and 422, and an area divided by the O-rings 420 and 422 and the casing 402 is watertightly sealed against the outside.

A flange portion 424 of relatively large diameter is provided near the caulked portion 412 of the cylinder 408. A small outer-diameter portion 426 having relatively small diameter is provided between this flange portion 424 and the outer end portion 414, and an annular space 430 which is communicated with the intake path 404 is formed between the small outer-diameter portion 426 and the inner wall 428 of the casing 402. Meanwhile, a piston hole 432 open to the outer end portion 414 and a discharge passage 434 which is communicated with the piston hole 432 at one end and is open at the other end are bored substantially coaxially into the cylinder 408, and a step portion 436 is formed in the communicating portion of the piston hole 432 and the discharge passage 434. A pair of long-diameter holes 438 having long diameters along the axis of the piston hole 432 and communicated with the piston hole 432 and annular space 430 are bored into the small outer-diameter portion 426 of the cylinder 408 in the diameter direction of the cylinder 408 so as to oppose each other.

In the piston hole 432 of the cylinder 408, a piston 444 having a first sliding portion 440 positioned near the outer end portion 414 and a second sliding portion 442 positioned near the center of the piston hole 432 is inserted such that the first sliding portion 440 and the second sliding portion 442 slidably move in the piston hole 432, and an X-ring 446 for the sealing is fitted on the ring groove 440a provided on the first sliding portion 440. A peripheral groove 448 formed in an annular shape is bored along the circumferential direction of the piston between the first sliding portion 440 and the second sliding portion 442 of the piston 444. Furthermore, a center hole 450 which is open at the end in the piston hole 432 and extends to near around the center of the piston is bored in the piston 444, substantially coaxially with the piston 444, and four communicating holes 454 which are communicated with this center hole 450 and open to the peripheral groove 448 are bored into the piston 444 so as to form angles of approximately 90 degrees each other along the radial direction of the piston 444.

On the other hand, a linking rod 454 which passes commonly through the center hole 450 and a pair of communicating holes 452 opposed each other so as to sandwich the center hole 450 is fitted onto the piston 444. Both end portions 456a and 456b of the linking rod 454 further pass through the long diameter hole 438 of the cylinder 408 and extend in the annular space 430 between the cylinder 408 and the casing 402, and is reciprocatable together with the piston 444 in the axial direction of the piston 444. However, the reciprocating motion of the linking rod 454 is restricted by the long diameter of the long diameter hole 438, and the stroke of the piston 444 is also restricted. A cylinder member 460 provided with a ring-holding groove 458 at its center portion and fitted on around the small outer-diameter portion 426 is contained in the annular space 430 slidably over the inner wall 428 of the casing 402 and the outer surface 426a of the small outer-diameter portion 426 of the cylinder 408. This cylinder member 460 links the link end portion 462 adjacent to the arrow R side of the ring-holding groove 458 to the end portions 456a and 456b of the linking rod 454, and is reciprocatable in the annular space 430 in accordance with the reciprocating motion of the piston 444. An inner-outer communicating hole which is communicated with the ring-holding groove 458 and the inside of the cylinder member 460 is bored into the cylinder member 460, and the ring-holding groove 458 can be communicated with the long diameter hole 438 of the cylinder 408 through the inner-outer communicating hole 464. In addition, communicating grooves 470 which have inclined bottom surfaces 468, the depth of which increases as distance away from the ring-holding groove 458 increases, are provided in a plurality of locations on the communicating end portion 466 which is adjacent to the ring-holding groove 458 on the opposite side of the link end portion 462, and a communicating path 472 is formed between these communicating grooves 470 and the inner wall 428 of the casing 402. Furthermore, a sliding ring 474 which slidably moves over the inner wall 428 of the casing 402 is fitted on the ring-holding groove 458. The axial length of this sliding ring 474 is slightly shorter than the width of the ring-holding groove 458, and the relative positions along the axial direction with the ring-holding groove 458 (equal to the cylinder member 460) can be changed within the range of this difference in length. When the cylinder member 460 is reciprocatingly driven by the piston 444, the cylinder member 460 is applied pressure by the side walls 458a and 458b of the ring-holding groove 458 and is movable in the same direction as the cylinder member 460. Additionally, a ring 476 for the sealing is fitted onto the small outer-diameter portion 426 of the cylinder 408.

According to the above structure, the cylinder member 460 and sliding ring 474 divide the continuous space made up of the annular space 430, long hole 438, peripheral groove 448, communicating hole 452, and center hole 450 into two portions, one is on the side of the intake path 404 and the other is on the side of the center hole 452, thereby forming the intake chamber 478 on the side of the intake path 404 and forming the discharge chamber 480 on the side of the center hole 450. However, this divided condition is not fixed, and the volumes of the intake chamber 478 and discharge chamber 480 vary according to the movement of the cylinder member 460 and sliding ring 474 accompanying the movement of the piston 444. In addition, when the sliding ring 474 is applied pressure by the side wall 458a (i.e., during movement in the direction of arrow L) accompanying the movement of the cylinder member 460, the intake chamber 478 and discharge chamber 480 communicate through the communicating path 472, ring-holding groove 458, and inner-outer communicating hole 464, but when the sliding ring 474 is applied pressure to by the side wall 458b (i.e., during movement in the direction of arrow R), the communication of the intake chamber 478 and discharge chamber 480 is interrupted.

For this reason, when the cylinder member 460 and sliding ring 474 are driven by the piston 444 and move in the direction of arrow R, the volume of the intake chamber 478 increases and the intake chamber 478 is in a reduced-pressure condition, and the discharge chamber 480 decreases in volume and is in a pressurized condition. Consequently, in this case fluid can be sucked into the intake chamber 478 from the intake path 404, and can be discharged from the discharge chamber 480. Meanwhile, when the cylinder member 460 and sliding ring 474 move in the direction of arrow L, the volume of the intake chamber 478 decreases and the volume of the discharge chamber 480 increases, but because the intake chamber 478 and discharge chamber 480 are communicated as the above, fluid can be moved from the side of the intake chamber 478 to the side of the discharge chamber 480.

The inner end 444a of the piston 444 positioned in the piston hole 432 has a smaller outer diameter than the second sliding portion 442, and a step portion 482 is formed on the connecting portion of the inner end portion 444a and the second sliding portion 442. A compression spring 484, which is substantially coaxial with the piston 444, is interposed between this step 482 and the opposing step portion 436 of the cylinder 408, and applies pressure to the piston in the direction of arrow R. In addition, the opening of the center hole 450 on the side of the inner end 444a is sealed with a ball needle 486 and provided with a contactable valve seat 488 formed in a spherical shape. A compression spring 490, which is substantially coaxial with the piston 444, is interposed between the ball needle 486 which contacts this valve seat 488 and the cylinder 408, and the compression spring 490 applies pressure to the ball needle 486 in the direction of arrow R. Because of this, the ball needle 486 is seated in the valve seat 488, but when the applying pressure force to the ball needle 486 from the side of the center hole 450 side overcomes the applying pressure force of the compression spring 490, the ball needle 486 is lifted from the valve seat 488.

Meanwhile, the outer end face 453 of the piston 444 is in contact with an eccentric cam (not shown), and the piston 444 can be driven by the rotation of the eccentric cam in the direction of arrow L in resistance to the applying pressure force of the compression spring 484. Consequently, when the eccentric cam is rotated, the piston 444 is reciprocatingly driven in the directions of arrows R and L by the eccentric cam and the compression spring 484. Also, when the ball needle 486 is seated in the valve seat 488, the piston 444 also receives the applying pressure force of the compression spring 490 via the ball needle 486, and so in this case the piston 444 is driven in the direction of arrow L in resistance to the composite applying pressure force of the compression spring 484 and compression spring 490. Volume varies, i.e., increases or decreases, according to the reciprocating motion of the piston 444 driven by the eccentric cam and compression springs 484 and 490. The space in the piston hole 432 becomes the pump chamber 492, and when the volume of the pump chamber 492 increases, fluid can be sucked into the pump chamber 492 from the side of the center hole 450.

On the other hand, in the spring case 410 interconnected with the cylinder 408 at the caulked portion 412, a ball chamber 494 which is communicated with the discharge passage 434 of the cylinder 408 and a spring-holding hole 494 formed in a cylindrical shape which is communicated with the ball chamber 494 at one end and closed at the other end are bored substantially coaxially with the discharge passage 434. In addition, a pair of discharge ports 498 which are communicated with the ball chamber 494 and open to the outer surface 410a of the spring case 410 are bored into the spring case 410 so as to oppose each other along the direction of the diameter of the spring case 410. The pair of discharge ports 498 are communicated with the discharge path 406 via a space 500 of annular shape which is formed by the outer surface 410a of the spring case 410, the O-ring 422, the flange portion 424 of the cylinder 408, and the casing 402. Furthermore, the opening of the discharge passage 434 bored into the cylinder 408 is sealed with a ball needle 502 contained in the ball chamber 494 and is provided with a contactable valve seat 504 formed in a spherical shape. This ball needle 502 is applied pressure in the direction or arrow R by a compression spring 506 which is inserted in the spring-holding hole 496 substantially coaxially with the discharge passage 434. Because of this, the ball needle 502 is seated in the valve seat 504, but when the applying pressure force to the ball needle 502 from the side of the discharge passage 434 overcomes the applying pressure force of the compression spring 506, the ball needle 502 is lifted from the valve seat 504. According to this structure, when the piston 444 moves in the direction that decreases the volume of the pump chamber 492, the fluid in the pump chamber 492 is in a pressurized condition and lifts the ball needle 502, and the discharge of fluid from the pump chamber 492 through the discharge ports 498 to the discharge path 406 is possible.

Next, the operation of this pump 400 is described. Because the principle of operation of the pump 400 of this embodiment is substantially the same as that of the pumps 100 to 300 of the first to third embodiments, FIG. 3 which was used in the description of the operation of the pump 100 in the first embodiment is referred again.

(First Stroke)

First, when the piston 444 is at top dead center (corresponding to FIG. 3A), the volume of the pump chamber 492 is at a minimum, and corresponds to the condition where the discharge of fluid from the pump chamber 492 to the side of the discharge path 406 has been completed. In addition, the sliding ring 474 is in contact with the side wall 458a of the ring-holding groove 458, and the intake chamber 478 communicates with the discharge chamber 480.

Next, the piston 444 receiving the applying pressure force of the compression spring 484 is lowered toward bottom dead center in accordance with the rotation of the eccentric cam. The volume of the pump chamber 492 increases in accordance with this lowering of the piston 444, and the pump chamber 492 is in a reduced-pressure condition. Additionally, when the cylinder member 460 interconnected with the piston 444 via the linking rod 454 moves together with the piston 444 toward bottom dead center by a distance corresponding to the difference in the axial length between the ring-holding groove 458 and sliding ring 474, the side wall 458b of the ring-holding groove 458 contacts the sliding ring 474 and the communication between the intake chamber 478 and the discharge chamber 480 is interrupted (corresponding to FIG. 3B).

Furthermore, the piston 444 continues to be lowered until reaching bottom dead center, and the cylinder member 460 also moves in accordance with this. In this manner, the sliding ring 474 is applied pressure via the side wall 458b of the ring-holding groove 458 and moves together with the cylinder member 460. Because the volume of the intake chamber 478 increases in accordance with this movement of the cylinder member 460 and is in a reduced-pressure condition, an amount of fluid corresponding to the increase of volume of the intake chamber 478 is sucked into the intake chamber 478 from the intake path 404. In addition, because the volume of the discharge chamber 480 decreases and is in a pressurized condition, the fluid of the discharge chamber 480 resists the applying pressure force of the compression spring 490 and lifts the ball needle 486, and flows into the pump chamber 492 (corresponding to FIGS. 3B and 3C).

In this manner, the intake of fluid from the intake port 404 to the intake chamber 478, the discharge of fluid from the discharge chamber 480, and the filling of fluid to the pump chamber 492 are performed in parallel in the first stroke.

(Second Stroke)

The piston 444, which has reached bottom dead center, continues to rise toward top dead center. When the piston 444 and cylinder member 460 rise from bottom dead center by a distance corresponding to the difference in the axial length between the ring-holding groove 458 and sliding ring 474, the side wall 458a of the ring-holding groove 458 contacts the sliding ring 474 (corresponding to FIG. 3(d)). In this condition, the intake chamber 478 and discharge chamber 480 are in communication via the communicating path 472, ring-holding groove 458, and inner-outer communicating hole 464.

Furthermore, the piston 444 continues to rise until reaching top dead center (corresponding to FIGS. 3D and 3A). In accordance with this rising of the piston 444, the cylinder member 460 moves in the same direction as the piston 444. The sliding ring 474 is also applied pressure via the side wall 458a of the ring-holding groove 458 and moves together with the cylinder member 460. In accordance with this movement of the cylinder member 460, the volume in the intake chamber 478 decreases and the volume in the discharge chamber 480 increases. Because the intake chamber 478 and discharge chamber 480 are communicated, fluid flows from the intake chamber 478 to the discharge chamber 480 according to the amount of increase in the volume of the discharge chamber 480.

In addition, the volume in the pump chamber 492 decreases in accordance with this rising of the piston 444, but because the discharge of fluid from the discharge chamber 480 is stopped, the applying pressure force which lifts the ball needle 486 disappears, and the ball needle 486 is seated in the valve seat 488. Consequently, communication between the side of the center hole 450 and the pump chamber 492 is interrupted, and the pump chamber 492 is in a pressurized condition in accordance with the decrease in its volume. For this reason, the fluid in the pump chamber 492 lift the ball needle 502 in resistance to the applying pressure force of the compression spring 506, flows outside the pump chamber 492, and is discharged from the discharge port 498 through the discharge path 406.

In this manner, the intake of fluid from the intake chamber 478 to the discharge chamber 480 and the discharge of fluid from the pump chamber 492 to the discharge path 406 are performed in parallel in the second stroke.

Moreover, the pump 400 sequentially repeats the first and second strokes, sucking fluid from the intake path 404 and discharging fluid from the discharge path 406.

As described the above, the pump 400 sucks fluid in accordance with the increase of volume in the intake chamber 478 in the first stroke. That is to say, the pump 400 can suck a volume of fluid which corresponds maximally to the amount of increase in volume in the intake chamber 478, and this amount of increase in volume in the intake chamber 478 becomes the possible intake volume QA of the pump 400.

As shown in FIG. 4, the possible intake volume QA of the pump 400 in the first stroke gradually increases from the time ($t_1$) corresponding to FIG. 3B to the time ($t_2$) corresponding to FIG. 3C, and reaches the maximum value Q0 when the piston 444 is at bottom dead center ($t_2$).

When the piston 444 passes bottom dead center and the second stroke begins, the volume in the intake chamber 478 decreases according to the movement of the cylinder member 460 to the side of the intake chamber 478, and on the back pressure side of the cylinder member 460 (which is equivalent to the side of the discharge chamber 480), the volume increases in correspondence to the amount of decrease in volume of the intake chamber 478.

As described the above, in the second stroke the ball needle 486 is seated in the valve seat 488, the space from the intake path 404 to the center hole 450 is in a communicated condition and is not communicated with any other portion of the pump 400.

Consequently, in the space extending from the intake path 404 to the center hole 450, the volume in the intake chamber 478 decreases and the volume in the discharge chamber 480 increases, sandwiching the cylinder member 460, but no change is observed in the volume of the entirety of this space. That is to say, the possible intake volume QA of the pump 400, which becomes the maximum value Q0 at bottom dead center of the piston 444, is maintained in the space extending from the intake path 404 to the center hole 450 ($t_2$ to $t_3$ to $t_4$ to $t_5$).

In this manner, the possible intake volume QA of the pump 400, which gradually increases in the first stroke and becomes the maximum value Q0 at the time ($t_2$) that the piston 444 reaches bottom dead center, is maintained throughout the second stroke, until the time ($t_5$, corresponding to FIG. 3B) when the communication of the intake chamber 478 and discharge chamber 480 is interrupted in the next cycle. For this reason, because the intake of fluid is continued from the first stroke throughout the second stroke, in the same of the pumps 100 to 300 of the first to third embodiments, the intake efficiency of the fluid to the pump 400 is more resistant to decrease than in the prior art, even in cases where the kinematic viscosity of the fluid is high. Consequently, the volumetric efficiency of the pump 400 does not drop, even when the kinematic viscosity of the fluid is high.

(Fifth embodiment)

Next, a fifth embodiment of the present invention is described with reference to the drawings.

This fifth embodiment is a structurally simplified type of the pumps of the above first to the fourth embodiments, and in particular for shortening of the axial length of the piston member.

Figure 11:
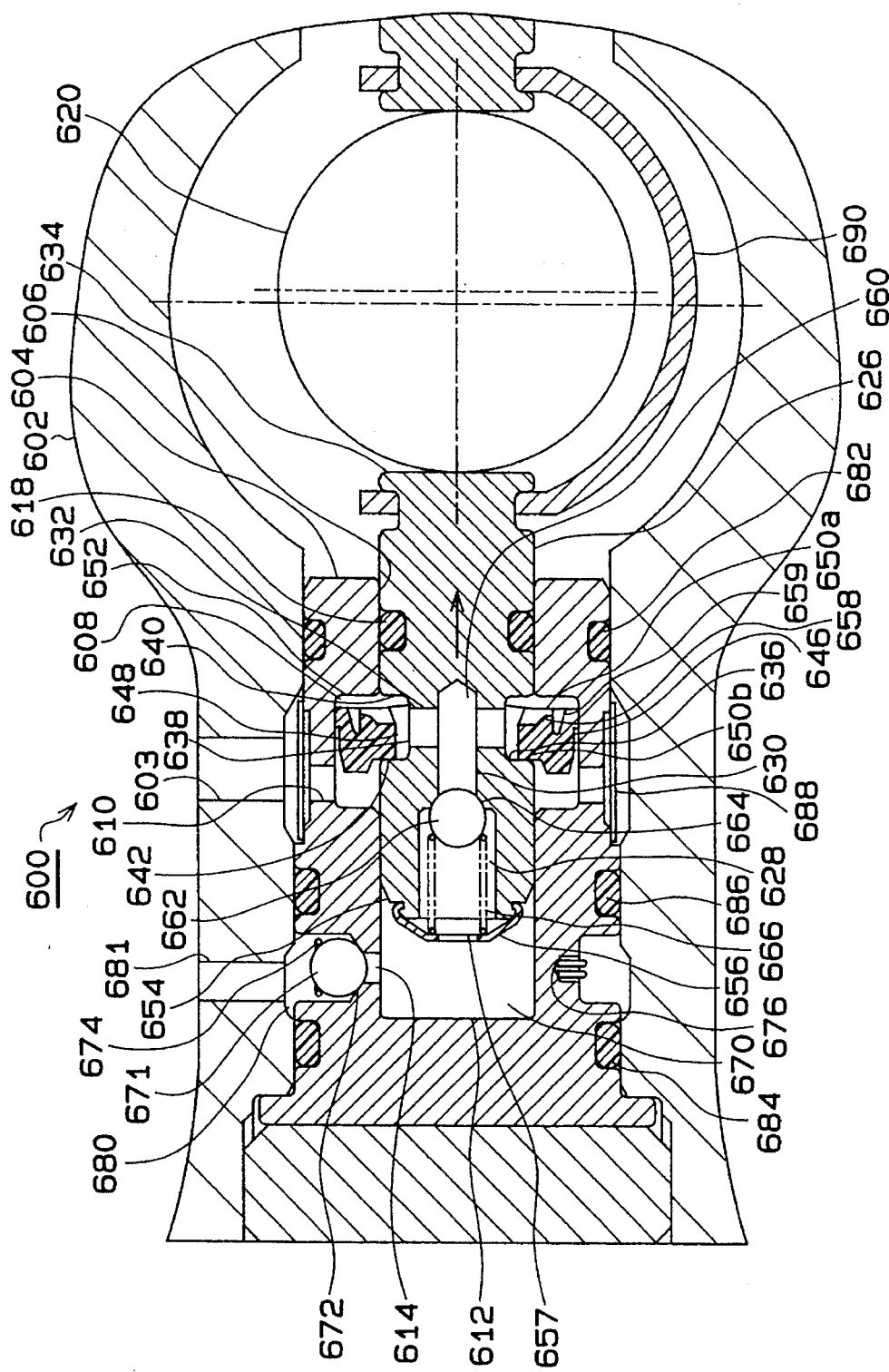
FIG. 11 is a cross sectional view showing a fifth embodiment.

As shown in FIG. 11, the pump 600 in this embodiment is comprised primarily of a cylinder member 604 and a piston member 626 slidably disposed in the housing of the pump 600, with the cylinder member 604 inserted into and fixed in a certain casing 602.

The cylinder member 604 is provided with a piston hole 106 open to the side of the eccentric cam member 620, and the piston is formed in a tubular shape. A large-diameter hole 608, the inner diameter of which is formed to be larger than the piston hole 626, is bored coaxially into a portion of the piston hole 606. In addition, a plurality of intake ports 610, which are communicated with the large-diameter hole 608 and are open outside, are bored into the cylinder member 604 along the radial direction of the large-diameter hole 608. The intake ports are communicated, through a communicating path 603 formed within the casing, with a reservoir tank which contains fluid.

A piston member 626 slidably disposed in the piston hole 606 is reciprocatably inserted into the cylinder member 604. An O-ring 618 for the sealing is interposed between this piston member 626 and the piston hole 606, and prevents leakage of the fluid. A pump chamber 670 is formed in the cylinder member 604 by dividing with the piston member 626, cylinder member 604 and ball needle 674, and ball needle 662. The volume of this pump chamber 670 is decreased by the movement of the piston member 626, and a discharge passage 614, which opens when the pressure of the fluid in the pump chamber 670 has risen, is bored into the side wall portion near the bottom surface 612 of the cylinder member 604 at one location only.

Center hole 628 and 630 having different diameters, which are open to the pump chamber 670 and extend to near around the large-diameter hole 608, are bored into the piston 626 substantially coaxially with the piston 626. Additionally, the reason why the diameter of the center hole 628 open to the pump chamber 670 is made larger than the diameter of the center hole 630 formed in the center portion of the piston member 626 is because the ball needle 662 and spring 666 are contained in the center hole 626, and also because its portion of varying diameter is utilized as the valve seat 664 of the ball needle 662.

In addition, a plurality communicating holes 632 for communicating the center hole 630 with the large-diameter hole 608 of the cylinder member 604 are bored into the piston member 626 so as to form angles of approximately 90 degrees each other along the radial direction of the piston member 626. Furthermore, a groove 636 formed in an annular shape is provided on the piston member 626 at the portion which is exposed to the large-diameter hole 608 and communicates with the communicating holes 632.

A sliding ring 646 composed of rubber slidably inserted in the inner periphery of the large-diameter hole 108 of the first cylinder member 604 is fitted on the groove 636 of the piston member 626. The inner diameter of this sliding ring 646 is larger than the outer diameter of the bottom surface 638 portion of the groove 636, and a gap 648 is formed between the sliding ring 646 and the bottom surface 638. In addition, the axial length of the sliding ring 646 is shorter than the clearance between the pair of side walls 640 and 642 of the groove 636. Consequently, it is possible for the sliding ring 646 and the groove 636 to change the relative position of the sliding ring 646 to the piston member 626 from the condition where the first end face 650a of the sliding ring 646 on the side of the eccentric cam member 620 contacts the side wall 640 to the condition where the second end face 150b of the sliding ring 646 on the side of the pump chamber 670 contacts the side wall 642. Moreover, when the piston member 626 is moved to the side of the pump chamber 670 by the rotation of the eccentric cam member 620, the sliding ring 646 can be moved together with the piston member 626 so that the first end face 650a of the sliding ring 646 is applied pressure by the side wall 640. Meanwhile, when the piston member 626 is moved to the side of the eccentric cam member 620, the sliding ring 646 can be moved in the same direction as the piston member 626 so that the second end face 650b of the sliding ring 646 is applied pressure by the side wall 642.

Because of this, when the sliding ring 146 is moved in the direction of the eccentric cam member 620 together with the piston member 626, the second end face 650b of the sliding ring 646 first contacts the side wall 642, interrupting the communication between the intake ports 610 and the gap 648, communicating holes 632, and center hole 630. In this manner, the chamber 660 formed by the communicating holes 632, center hole 630, ball needle 662, gap 648, and space 652 in the large-diameter hole 608 on the side of the first end face 650a of the sliding ring 646 is sealed. If the piston member 626 and sliding ring 646 move further from this condition, the volume in the space 652 is reduced and the volume of the above chamber 660 is also reduced, and so the fluid in this chamber 660 is in a pressurized condition, and fluid can be discharged from the center hole 630 toward the ball needle 662. At this time, the volume of the large hole 608 on the side of the intake port 600 simultaneously expands by an amount equal to the reduction in the volume of the space 652. Meanwhile, when the sliding ring 646 moves together with the piston 626 to the side of the pump chamber 670, first the second end face 650b of the sliding ring 646 and the side wall 642 separate, and then the first end face 650a contacts the side wall 640. Because of this, the intake ports 610 and the above chamber 660 are communicated, and fluid can flow into the chamber 660 from the intake ports 610. That is to say, the sliding ring 146 cuts off a portion of the sliding ring 646 on the side of the first end face 650a which contacts the side wall 640 of the groove 636, and a communicating portion 658 which communicates the gap 648 and the space 652 in the large-diameter hole is formed. Because of this, the fluid of the large-diameter hole 608 on side of the intake port 610 can be led through the gap 648 to the space 652 when the space 652 is expanded. In addition, it is no longer necessary to independently form a communicating path which communicates with the space in the piston member, thereby simplifying the machining of the piston member 626 together with enabling a reduction of length in the axial direction. Moreover, when the piston member 626 and sliding ring 646 move, the space 652 in the large-diameter hole 608 on the side of the first end face 650a of the sliding ring 646 is expanded, and so the volume of the chamber 660 expands and is in a reduced-pressure condition (vacuum condition), and the fluid of the large-diameter hole 608 on side of the intake port 600 flows into the chamber 660.

In this way, the sliding ring 646 functions together with the piston member 626 as a piston which reduces and expands the volume of the chamber 660, and as a switching valve which communicates and interrupts the chamber 660 and the side of the intake port 610. In particular, the sliding ring 646 engages both side walls 640 and 642 of the groove 636 of the piston member 626, is moved by reciprocating motion of the piston member 626 so as to open and close. For this reason, as different from a ball valve which is normally applied pressure by means of a spring, the fluid receives no resistance when the valve is open, and can pass through this valve. Furthermore, the chamber 660 expands and reduces in its volume by the sliding ring 646 in accordance with the reciprocating motion of the piston member 126, thereby functioning as a pump chamber. Accordingly, by means of this pump chamber expanding when the valve is open, fluid flows into the chamber 660 even more easily. Consequently, it becomes possible to cause a sufficient quantity of fluid to flow into the chamber 660, even in case that the kinematic viscosity of the fluid is high. Moreover, the sliding ring 646 expands the volume of the large-diameter hole 608 on the side of the intake port 600 when the chamber 660 is closed. By means of this, force (vacuum) which absorb fluid toward the intake port of the pump 600 occurs on the side of the intake port 610 from the time that the chamber 660 is closed, and so fluid can be inducted into the chamber 660 even in case that the fluid's kinematic viscosity is high and inflow speed is low.

The sliding ring 646 is provided with a notch at the portion which comes into contact with the side wall 642 of the groove 636, and the notch surface is taken as the second end face 650b which contacts the side wall 642, in order to prevent damage to the sliding ring 646 when assembling the pump 600. A detailed description is given later.

Additionally, a concavity 659 is provided in the inside of the sliding ring 646 along the inner peripheral surface of the large-diameter hole 608. By means of this, fluid enters this concavity 659 and enhances the seal to the large-diameter hole 608 of the sliding ring 646 in case that the chamber 660 is closed and fluid pressure rises. By means of this, the seal of the chamber 660 relative to the intake ports 610 can be improved.

An end 634 of the piston member 626 on the side protruding from the cylinder member 604 is in contact with the eccentric cam member 620. This eccentric cam member 620 is driven and rotated by an electric motor (not shown) or the like, and the piston member 126 reciprocatingly moves by the rotation of this eccentric cam member 620. Also, although not shown, bearings are fitted onto the outer periphery of the eccentric cam member 620, preventing friction with the end 634 of the piston member 626. Additionally, in the embodiment shown in FIG. 11, pump mechanisms having the same structure are arranged in opposing positions with the eccentric cam member 620 taken as the center. By interconnecting the cylinder members 626 of the pump mechanisms each other in opposing positions by a ring member 690, the piston members 126 can be movably reciprocated without a spring in the pump chamber 670. By means of this, it is possible to reduce the axial length of the pump 600.

In addition, in order to make it easier to insert the piston member 626 in the cylinder hole 606 of the cylinder member 604, an inclined portion 654 is formed on the end on the side of the pump chamber 670 of the piston member 626. A spring support member 656 is fixed to this inclined portion 654. This spring support member 156 is for supporting the spring 166 which applies pressure to the ball needle 662 inserted into the center hole 128 in the direction of closing of the valve seat 664 formed by the center holes 628 and 630. In this manner, by supporting the spring 666 with the spring support member 656 which is interlocked with the piston member 626, it is possible to maintain a uniform force which applies pressure to the ball needle 662, irrespective of the reciprocating motion of the piston member 626. Also, this spring support member 656 is provided with a hole 657 in the proximity of the opening of the center hole 630 so as to prevent obstruction of the flow of the fluid from the center hole 630 to the pump chamber 670. Furthermore, in order to make it easier to insert into the cylinder hole 606 of the piston member 626, the spring support member 656 is formed in a conical shape.

In this manner, by adopting a conical shape for the spring support member 656 and also providing an inclined portion 654 on the piston member 626, the assembling of the pump 600 can be accomplished simply by inserting the piston member 626 into the piston hole 606 after inserting the sliding ring 646 in the large-diameter hole 608 of the cylinder member 604. Consequently, the assembling effectiveness of the pump can be highly improved. In this assembling, the sliding ring 646 is pressed and widened by the spring support member 656 and the inclined portion 654, and the sliding ring 646 is also pressed in the direction of insertion of the piston member 626. However, because a notch is provided on the second end face 650*b* of the sliding ring 146, damage to the sliding ring 646 due to being clipped by the piston member 626 and cylinder member 604 when inserting the piston member 626 can be prevented.

A groove is cut on the cylinder member 604 around the opening of the discharge passage 144 bored into the cylinder member 604, and a ball needle 671 is disposed in this discharge groove 680. This ball needle 671 and the ring material 674 applying pressure to the ball needle are described with respect to FIGS. 12A to 12D.

Figure 12B:
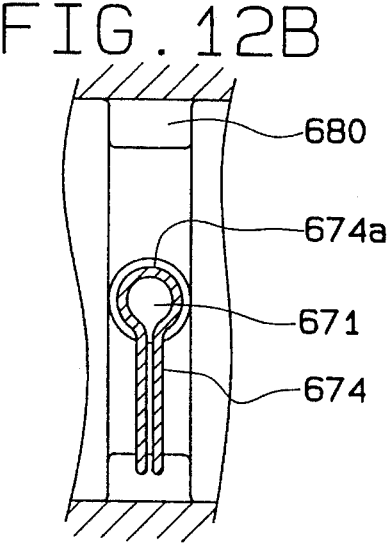
FIGS. 12A to 12D show a structure of a ball valve on discharge side of the pump in the fifth embodiment.
Figure 12C:
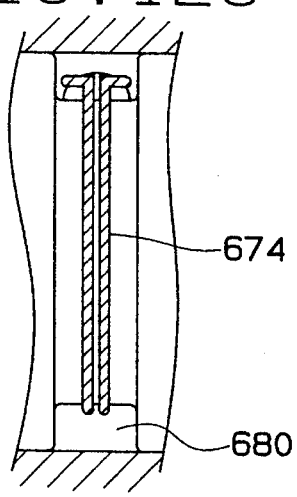
Figure 12D:
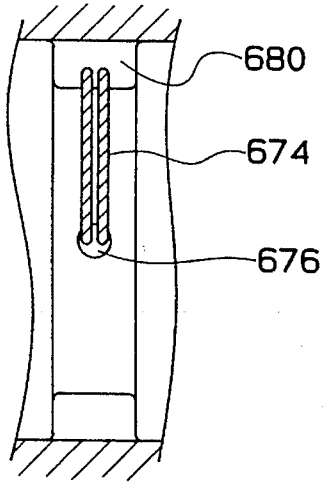
Figure 12A:
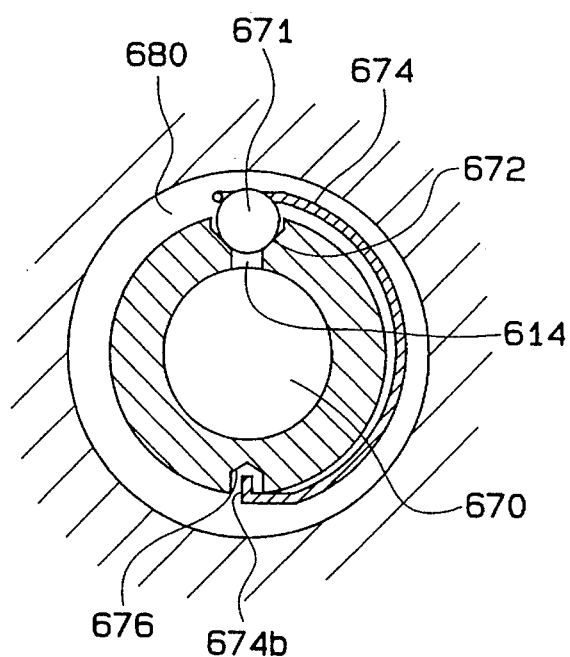

As shown in FIG. 12A, a conical-shaped valve seat 672, which is in contact with the valve seat 671 so as to form a seal therebetween, is formed on the portion in which the discharge passage 614 is communicated with the discharge groove 680. The ring material 674, as shown in FIGS. 12A to 12D, is composed of a double wire formed by a wire having elastic force being bent back at the ball needle 671. The portion of this wire 674 bent back on the side of the ball needle is formed into an arc shape, and this arc-shaped portion 674*a* supports the ball needle 671. Meanwhile, a bend portion 674*b* is formed at the other end of the ring material 674. The assembling of the ring material 174 having the above structure is completed simply by inserting the bend portion 674*b* into the hole area 676 formed at the opposite position of the discharge passage 614, and also engaging the arc-shaped portion 674*a* with the ball needle 671. The ring material 674 applies pressure to the ball needle 671 with the arc-shaped portion 674*a* by its elastic force, the one end of the bend portion 674*b* as the fulcrum. By making one end of the ring material 674 the fulcrum and the other end the movable portion in this manner, the elastic force for the predetermined discharge pressure can also be set easily. As the discharge groove 680 is formed so that the ring material 674 is contained in the discharge groove 680, the ring material 674 does not rotate using both ends as fulcrums.

As the ball needle 671 and ring material 674 have the above structure, the ball needle is usually seated in the valve seat 672. However, when the applying pressure force to the ball needle 671 from the side of the discharge passage 614 overcomes the applying pressure force of the ring material 674, the ball needle 671 moves away from the valve seat 672. Consequently, when the piston member 626 moves in the direction that reduces the volume of the pump chamber 670, the fluid in the pump chamber 670 is in a pressurized condition and lifts the ball needle 671, and fluid from the pump chamber 670 to the discharge port 681 can be discharged.

Moreover, the casing 602 and pump 600 are watertightly sealed with the O-ring 682 fitted on the end portion of the cylinder member 604 on side of the eccentric cam member 620, the O-ring 684 fitted on the end portion on the side of the pump chamber 670, and the O-ring 686 fitted near the center. The portion of the space formed between the casing 602 and the pump 100 corresponding between the O-ring 682 and the O-ring 686 is taken to be the intake path, and the portion of the space formed between the casing 602 and the pump 600 corresponding between the O-ring 184 and the O-ring 686 is taken to be the discharge path. A filter 688 is disposed between the communicating path 103 and the intake ports 610 to prevent the extraneous material from entering into the pump 600.

Next, the operation of this pump 600 is described.
(First Stroke)

First, in case when the piston member 626 has reached top dead center (the position where the piston member 626 has reduced the volume of the pump chamber 670 to a minimum), the discharge of fluid from the pump chamber 670 to the side of the discharge port 681 has been completed. In addition, the sliding ring 646 causes the first end face 650*a* to be in contact with the side wall 640 of the groove 636, and the intake ports 610 and the chamber 660 are communicated. At this time, because the sliding ring 646 has moved together with the piston member 626 in the direction of the pump chamber 670, the volume in the chamber 660 is at its most expanded condition, and fluid introduced from the intake ports 610 is filled in the chamber 660.

Next, the piston member 626 receives force from the ring material 690 in the direction of the eccentric cam member 620 and moves (movement in this direction is hereinafter referred to as "lowering") from top dead center toward bottom dead center (the position where the piston member 626 has expanded the volume of the pump chamber 670 to a maximum) in accordance with the rotation of the eccentric cam member 620. The volume of the pump chamber 670 increases in accordance with this lowering of the piston member 626, and the pump chamber 670 is in a reduced-pressure condition.

When the piston member 626 has been lowered from top dead center by a distance corresponding to the difference in the axial length between the groove 636 and sliding ring 646, the side wall 642 of the groove 636 is in contact with the second end face 650*b* of the sliding ring 646. In this condition, the communication between the intake ports 610 and the chamber 660 is interrupted by the contact of the side wall 642 and second end face 650*b*, and the chamber 660 is sealed.

Furthermore, the piston member 626 continues to be lowered until reaching bottom dead center. During this lowering of the piston member 626, the sliding ring 646 is applied pressure via the side wall 642 of the groove 636 and moves in the same direction as the piston member 626. Because the volume in the space 652 is reduced and the chamber 660 is in a pressurized condition in accordance with this movement of the sliding ring 646, the fluid in the chamber 660 resists the applying pressure force of the compression spring 666 from the center hole 630 and lifts the ball needle 662. Also, because the volume in the large-diameter hole 608 on the side of the intake port 610 increases by an amount corresponding to the decrease in volume of the space 652, a vacuum is generated and the fluid is absorbed through the intake ports 600.

Consequently, as the pump chamber 670 is in a reduced-pressure condition and the fluid in the chamber 660 is in a pressurized condition in such a manner, the ball needle 660 moves away from the valve seat and fluid flows into the pump chamber 670 from the chamber 660.
(Second Stroke)

The piston member 626, which has reached bottom dead center, continues to move toward top dead center (movement in this direction is hereinafter referred to as "rising").

When the piston member 626 has risen from bottom dead center by a distance corresponding to the difference in the axial length between the groove 636 and sliding ring 646, the side wall 640 of the groove 636 is in contact with the first end face 650*a* of the sliding ring 646. In this condition, the intake ports 610 and the chamber 660 are communicated through the clearance between side wall 642 and the second end face 650*b* of the sliding ring 646.

Furthermore, the piston member 626 continues to rise until reaching top dead center. During this rising of the piston member 626, the sliding ring 646 is applied pressure via the side wall 640 of the groove 636 and moves in the same direction as the piston member 626. In accordance with this movement of the sliding ring 646, the volume in the space 652 increases and the chamber 660 is in a vacuum condition. As a vacuum has already been generated on side of the intake port 610 in the first stroke, the location of generation of the vacuum is only moved from outside to inside the chamber 660 by the expansion of the chamber 660, and the vacuum's magnitude itself does not change. In such a condition, the intake ports 610 and the chamber 660 are communicated, and so fluid corresponding to the amount of volume increase of the space 652 flows from the intake ports 610 to the chamber 660.

In addition, as the piston member 626 shifts from lowering to rising, the increase in the volume of the pump chamber 670 stops and then conversely begins to decrease. At this time, the force which lifts the ball needle 662 disappears, and the ball needle 662 is seated in the valve seat 664. Consequently, communication between the side of the center hole 628 and the pump chamber 670 is interrupted, and the pump chamber 670 is in a pressurized condition in accordance with the decrease in its volume. For this reason, the fluid in the pump chamber 670 in which the pressure has risen resists the applying pressure force of the ring material 674 to lift the ball needle 671, flows outside the pump chamber 670, and is discharged from the discharge port 692.

Moreover, pump 600 sequentially repeats the first and second strokes, sucking fluid from the intake ports 610 and discharging fluid from the discharge port 681.

As described the above, the pump 600 sucks fluid in accordance with the increase of volume of the space 652 in the first stroke. That is to say, the pump 600 can suck a volume of fluid which corresponds maximally to the amount of increase in volume of the space 652. Consequently, this amount of increase in volume of the space 652 becomes the possible intake volume QA of the pump 600.

However, as mentioned the above, when the volume of the space 652 decreases in the first stroke, the volume of the large-diameter hole 608 on the side of the intake port 600 increases by an amount corresponding to the amount of decrease. Consequently, force (vacuum) which absorbs the fluid is generated at the large-diameter hole 608 on side of the intake port 600 of the pump from the first stroke.

Consequently, as shown in FIG. 4, the possible intake volume QA of the pump 600 gradually increases from the time ($t_1$) in the first stroke when the side wall 642 of the groove 636 contacts the second end face 650b of the sliding ring 646 to the time ($t_2$) when bottom dead center is reached, and the maximum value Q0 is when the piston member 626 is at bottom dead center ($t_2$).

When the piston member 626 passes bottom dead center and the second stroke begins, the volume of the large-diameter hole 608 on the side of the intake port 610 decreases according to the movement of the sliding ring 646 to the side of the pump chamber 670, but the amount of decrease is equivalent to the amount of increase of the volume of the space 652 in the chamber 660.

As described the above, in the second stroke the ball needle 662 is seated in the valve seat 664, and so the chamber 660 is communicated only with the intake ports 610. Consequently, in the space from the intake ports 610 to the chamber 660, the volume of the large-diameter hole 608 on the side of intake port 610 decreases and the volume of the space 652 increases, sandwiching the sliding ring 646, but no change is seen in the volume of the entirety of this space. That is to say, the possible intake volume QA of the pump 600, which becomes the maximum value Q0 at bottom dead center of the piston member 626, is maintained in the space from the intake ports 610 to the chamber 660 ($t_2$ to $t_3$ to $t_4$ to $t_5$).

In this manner, the possible intake volume QA of the pump 600, which gradually increases in the first stroke and becomes the maximum value Q0 at the time ($t_2$) that the piston 626 reaches bottom dead center, is maintained throughout the second stroke, until the time ($t_5$,) when the communication of the intake ports 610 and the chamber 660 is interrupted in the next cycle. For this reason, the volumetric efficiency of the pump 600 does not drop, even in case that the kinematic viscosity of the fluid is high.

Figure 21:
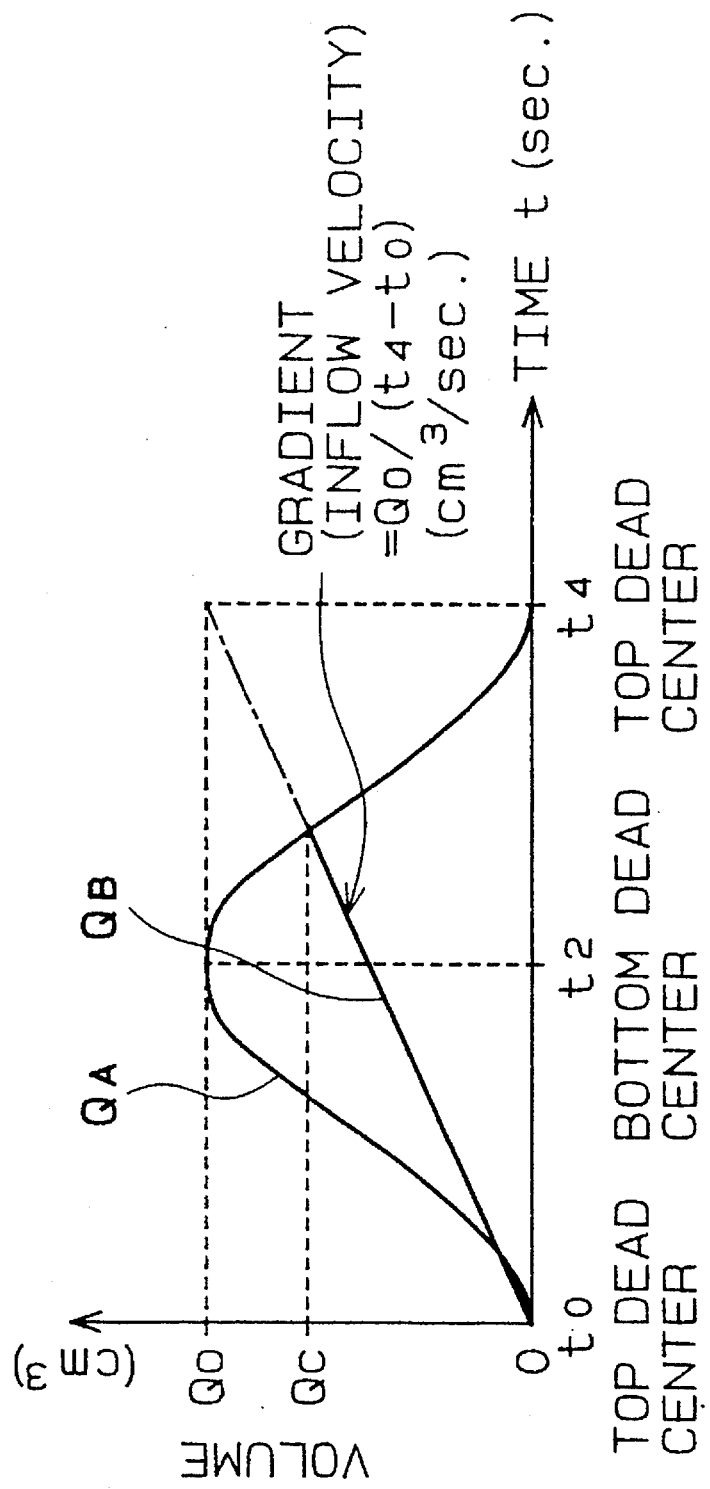
FIG. 21 is a graph of the changes in the possible intake volume of the pump of the prior art.

FIG. 3 shows the changes across time of the inflow quantity QB of fluid to the pump 600 as the same as the first embodiment. Even in the case when the inflow quantity QB [$cm^3$] of fluid occurs only at an inflow speed of $Q0/(t_5-t_1)= Q0/(t_4-t_0)$ [$cm^3$/sec.], the final inflow quantity QC per cycle is able to reach as high as the maximum value Q0, and the volumetric efficiency of the pump 610 does not decline. On contrary to this, in the prior art, as shown in FIG. 21, the possible intake volume QA decreases even with inflow at the same inflow speed ($Q0/(t_4-t_0)$[$cm^3$/sec.]), and therefore the final inflow quantity QC can only attain approximately 69% of the maximum value Q0, and the volumetric efficiency of the pump declines.

Because the intake of fluid in the present embodiment continues from the first stroke through the second stroke in this manner, the intake efficiency of the fluid to the pump is more resistance to decrease than the prior art, even in cases that the kinematic viscosity of the fluid is high. Consequently, the volumetric efficiency of the pump 600 is resistant to decline even when the kinematic viscosity of the fluid is high.

In addition, the pump 600 of the fifth embodiment can be used for, for example, an anti-skid device (ABS) or traction device (TRC). In an ABS or TRC, a pressure of approximately 150 to 200 atmospheres is required as the discharge pressure of the pump. Such pressure is created in the pump chamber 670, but because the ball needles 662 and 671 are provided at the intake and discharge ports of this pump chamber 670, there is adequate ability to withstand even high pressures. On the other hand, the chamber 660 functions as a pump chamber, but because the pressure of this chamber 660 generates only enough pressure to open the ball needle 662 (approximately 1 to 2 atmospheric pressure), the chamber 660 can be sealed adequately by the sliding ring 646 and durability can also be assured.

(Sixth Embodiment)

Figure 13:
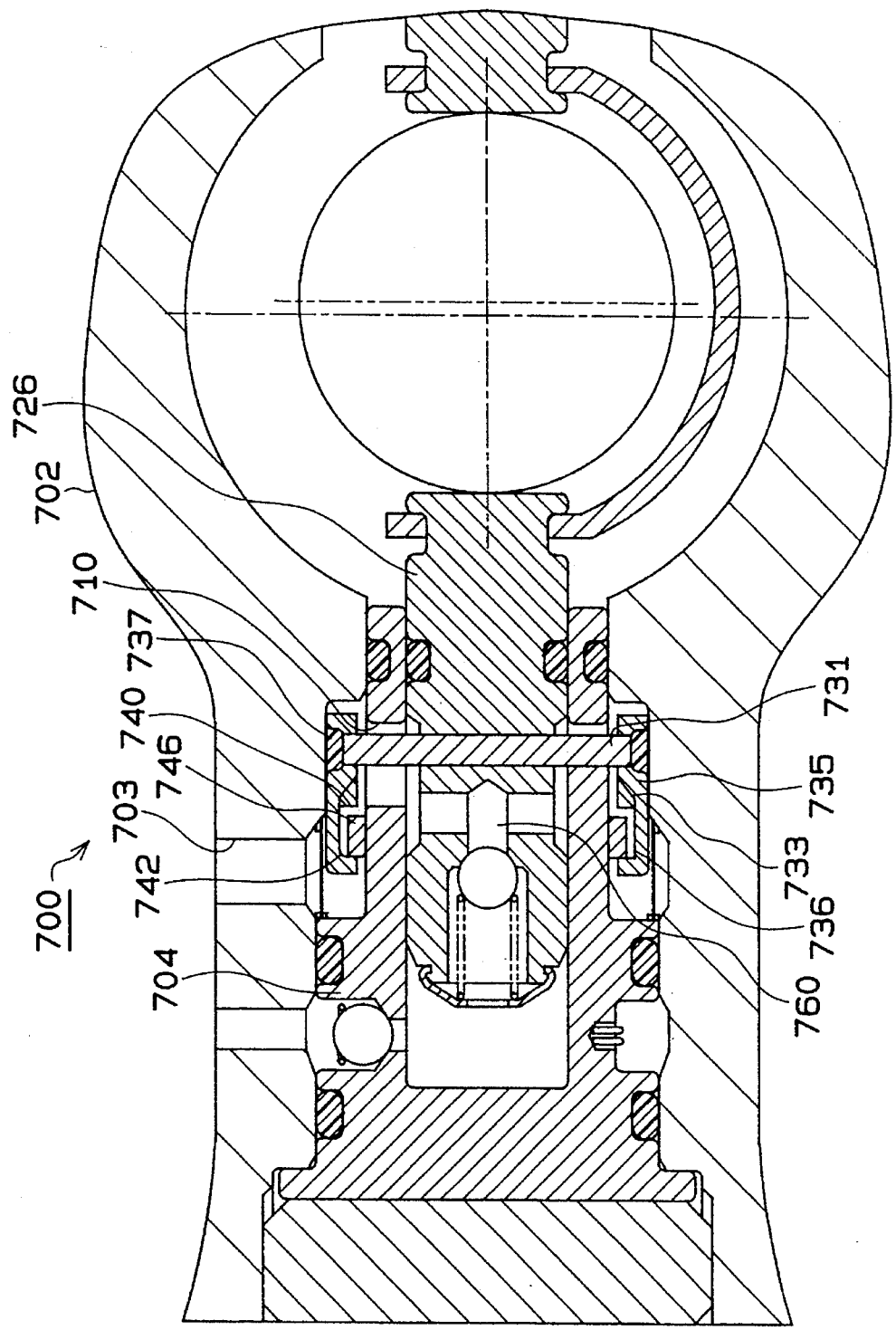
FIG. 13 is a cross sectional view showing a sixth embodiment.

As shown in FIG. 13, the pump 700 in the sixth embodiment differs from the fifth embodiment in having a structure wherein a sliding ring 746 is provided so that it slides over the outer peripheral surface of the cylinder member 704.

Hereinafter is described only this differing structure.

In FIG. 13, a linking rod 731 is press-fitted near the center of the piston member 726 and reciprocated together with the piston member 726. This linking rod 731 protrudes to the outside of the cylinder member 704 through the intake port 710 of the cylinder member 726. Both ends of the linking rod 731 are fitted with the sliding member 735 formed in an annular shape, and the reciprocating motion of the piston member 726 is transferred to the sliding member 735 via the linking rod 731. This sliding member 735 slides over the casing 802 around the cylinder member 704, and a rubber ring 737 is disposed on its sliding surface. This rubber ring 737 keeps a sealing between the communicating path 703 of the casing and the chamber 760.

A groove 736 is formed on the surface of the sliding member 735 on the side of the cylinder member 704. The sliding ring 746 is fitted on the outer peripheral surface of the cylinder member 704 so that both end faces are in contact with both side walls 740 and 742 of this groove 736. The width of this sliding ring 746 is shorter than the groove 736 of the sliding member 735. Accordingly, by the sliding member 735 reciprocating in the same of the piston member 726, the groove 736 of the sliding member 735 and the sliding ring 746 function as a switching (opening and closing) valve. A plurality of notches 733 are formed on the side of the side wall 740 to ensure the communication of the communicating hole 703 and chamber 760 when the sliding ring 746 is in contact with the side wall 740 of the groove 736.

The operation and effects in the sixth embodiment of the above structure are fundamentally identical to that of the fifth embodiment. However, in the above-mentioned fifth embodiment, the sliding ring 746 doubled in functioning as a switching valve and piston for the chamber 760, on the other hand, in the sixth embodiment, the functioning as a piston is allocated to the sliding ring 746, sliding member 735, and rubber ring 737.

(Seventh embodiment)

Figure 14:
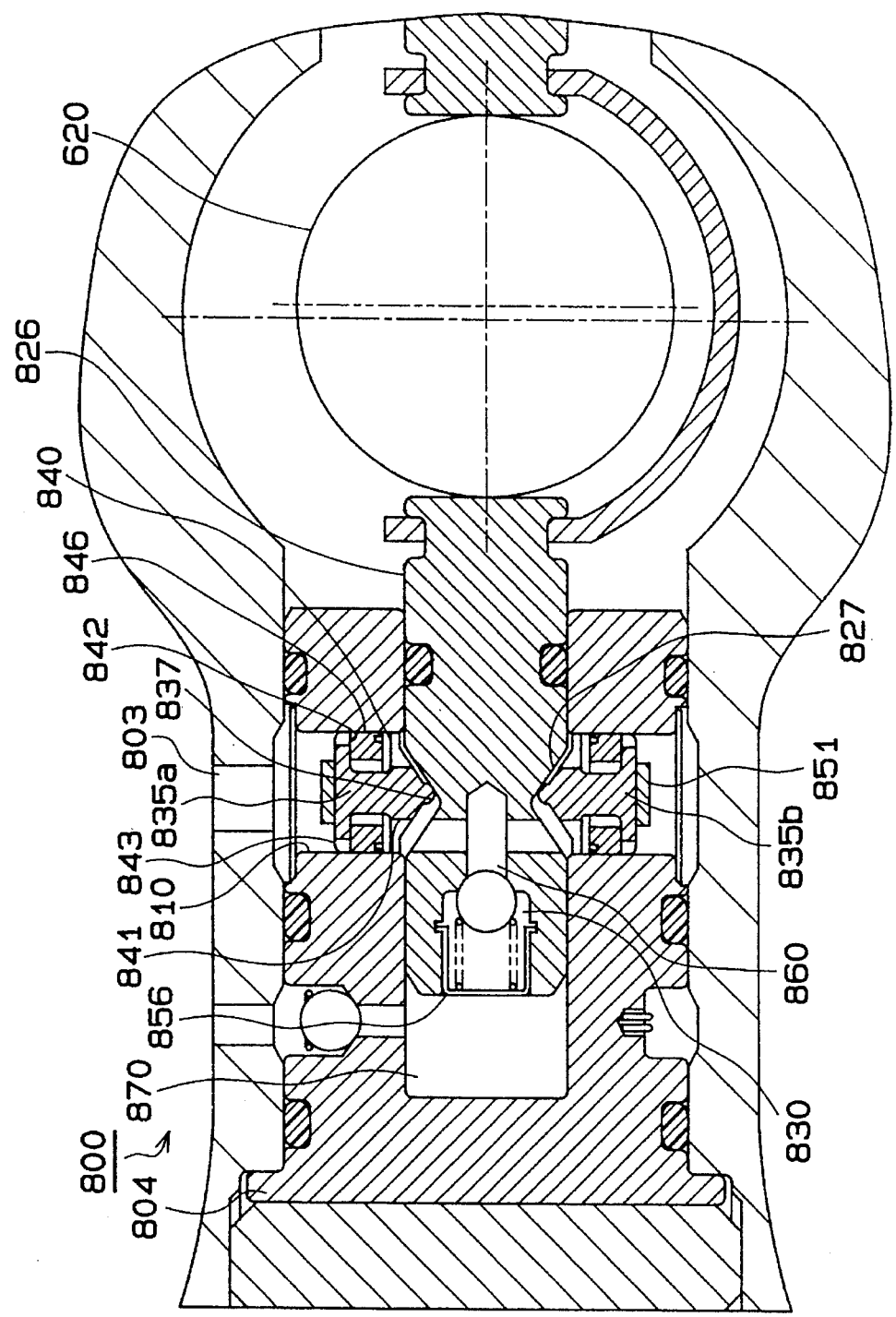
FIG. 14 is a cross sectional view showing a seventh embodiment.

As shown in FIG. 14, the pump 800 in the seventh embodiment differs from the fifth embodiment in having a structure wherein a sliding ring 846 is provided so that it moves in a direction perpendicular to the direction of movement of the piston member 826.

Hereinafter is described only this differing structure.

As shown in FIG. 14, two sliding members 835a and 835b having the same structure are disposed at the intake port 810 in opposing positions with the piston member 826 as the center. At the portions opposing the positions where these sliding members 835a and 835b are disposed, a cavity 827, the cross-section of which is triangular in shape, is formed in the piston member 826. The surfaces of the sliding members 835a and 835b on the side of the piston member 826 are formed in a pyramidal shape corresponding the shape of the cavity 827, with their tip portions formed in a spherical shape.

Accordingly, by the piston member 826 reciprocating, the spherical portions 837 of the tip portions of the sliding members 835a and 835b slide in the intake port 810 of the cylinder member 804 in a direction perpendicular to the direction of movement of the piston member 826. FIG. 14 shows the condition wherein the piston member 826 is at bottom dead center, and the spherical portions 837 slide only over the inclined surface of the cavity 827 on the side of the eccentric cam member 620. This is why the relationship that the chamber 860 expands when the pump chamber 870 is reduced, and that the chamber 860 is reduced when the pump chamber 870 expands is satisfied.

These two sliding members 835a and 835b are interconnected with each other by a plate spring 851. Consequently both sliding members 835a and 835b are constantly applied pressure in the direction so as to press the piston member 826. Accordingly, when the piston member 826 moves from top dead center toward bottom dead center, the spherical portions 837 of the sliding members 835a and 835b can slide in the direction of the apex of the cavity 827 along the inclined surface of the cavity 827. Consequently, both sliding members 835a and 835b move from their farthest positions to their closest positions each other.

In these two sliding members 835a and 835b, a sliding ring 846 is provided on the sliding surface of the intake port 810. This sliding ring 846 can move in the sliding member 835a relatively to the sliding member 835a, is in contact with both side walls 840 and 824, and slides together with the sliding member 835a. When the sliding ring 846 is in contact with the side wall 842, the communication of the communicating path 803 and the chamber 860 functioning as a pump chamber is interrupted. Meanwhile, when the sliding ring 846 is in contact with the side wall 840, the communicating path 803 and the chamber 860 are communicated through communicating holes 843 formed in a plurality of locations on the side of the side wall 842 and communicating holes 841 formed in a plurality of locations on the side of the side wall 840.

In the present embodiment, when assembling the pump 830, it is necessary to insert the piston member 826 into the piston 806 while resisting the elastic force of the plate spring 851. For this reason, the spring support member 856 is contained entirely in the center hole 830 to prevent its being damaged.

The operation and effects of the seventh embodiment of the above structure are fundamentally identical to that of the fifth embodiment. Similarly to the sixth embodiment, however, the functioning as a piston with regard to the chamber 660 is allocated to the sliding ring 846 and sliding members 835a and 855b.

The present invention is described according to the fifth through the seventh embodiments, but the present invention is not exclusively limited to these embodiments, and can be embodied in a various ways within a scope that does not departure from the essence of the present invention.

Figure 15:
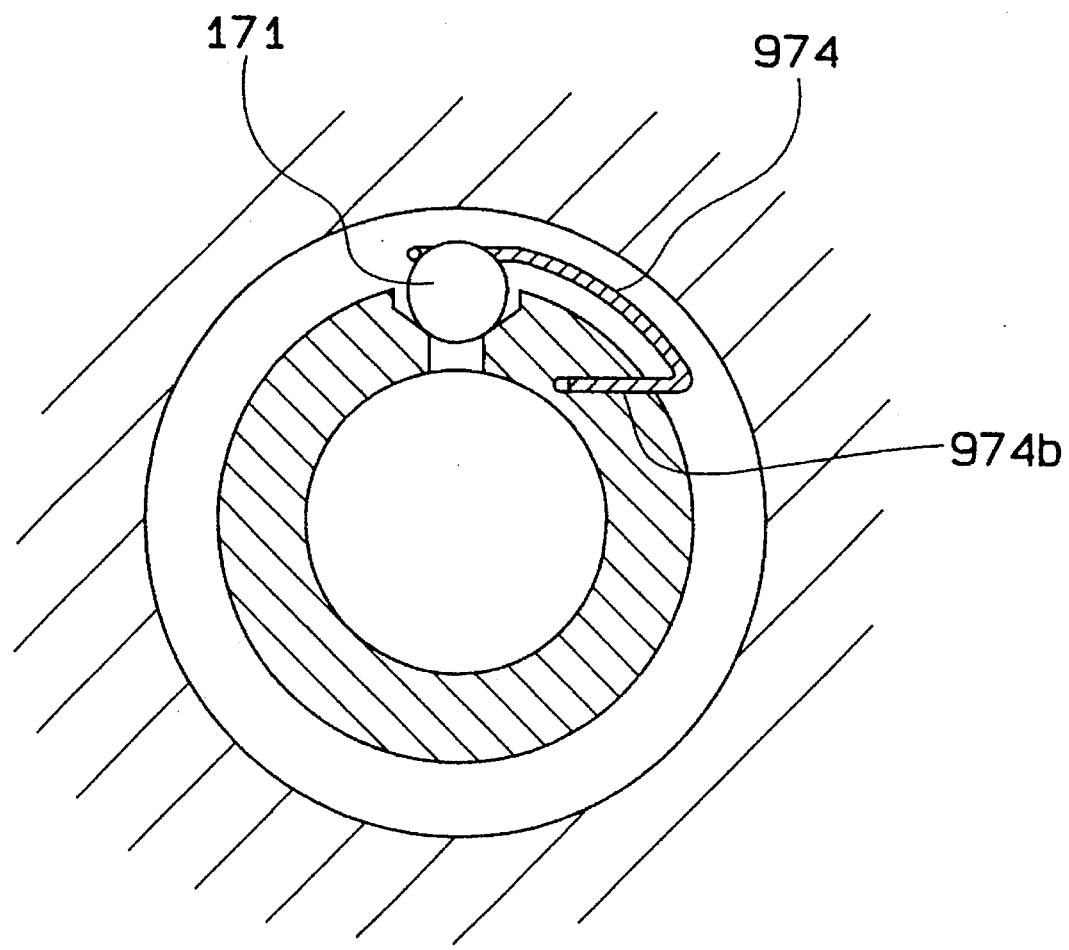
FIG. 15 shows a modification of the embodiment.
Figure 16B:
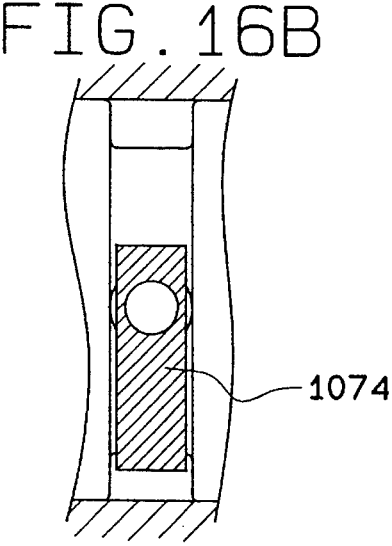
FIGS. 16A to 16D show another modification of the embodiment.
Figure 16C:
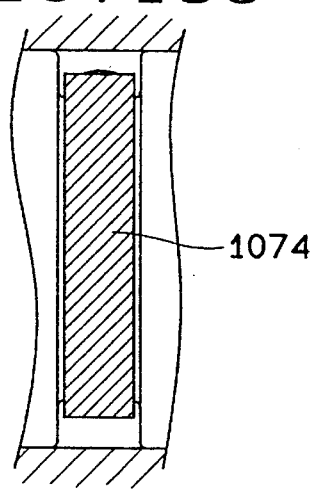
Figure 16A:
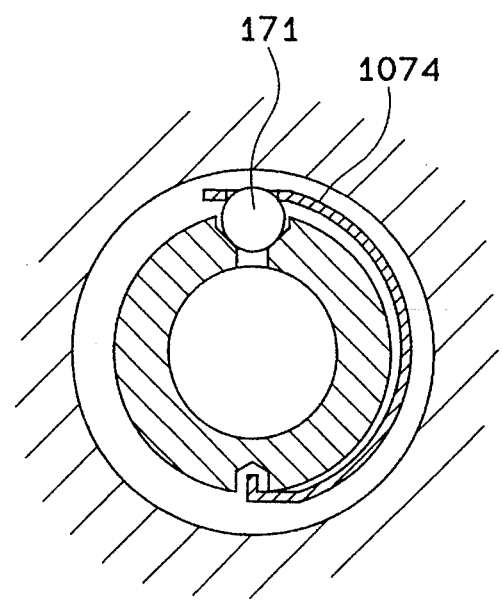
Figure 16D:
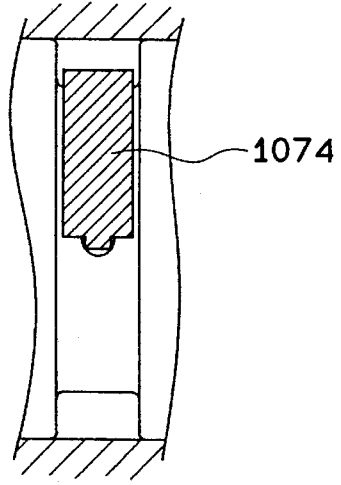

For example, in the fifth embodiment, a ball needle 670 is structured so as to be applied pressure by a ring material 674 formed in a half-circular shape. However, as shown in FIG. 15, it is acceptable for the length of the ring material 974 to be shorten so that the bend portion 974b is press-fitted to the cylinder member. That is to say, if the fulcrum side of the ring member 974 is fixed on the outer periphery of the cylinder member, the body size of the cylinder member can be made more compact in comparison with the case that a coil spring is employed.

In addition, as shown in FIGS. 16A to 16D, it is also possible to compose the ring material 1074 by a plate spring, not by a double wire. In this case, the portion engaged with the ball needle 670 is gouged in a circular shape, and the ball needle 670 is maintained with this gouged portion. The embodiment shown in FIGS. 16A to 16D structurally corresponds to the embodiment shown in FIGS. 12A to 12D.

Figure 17:
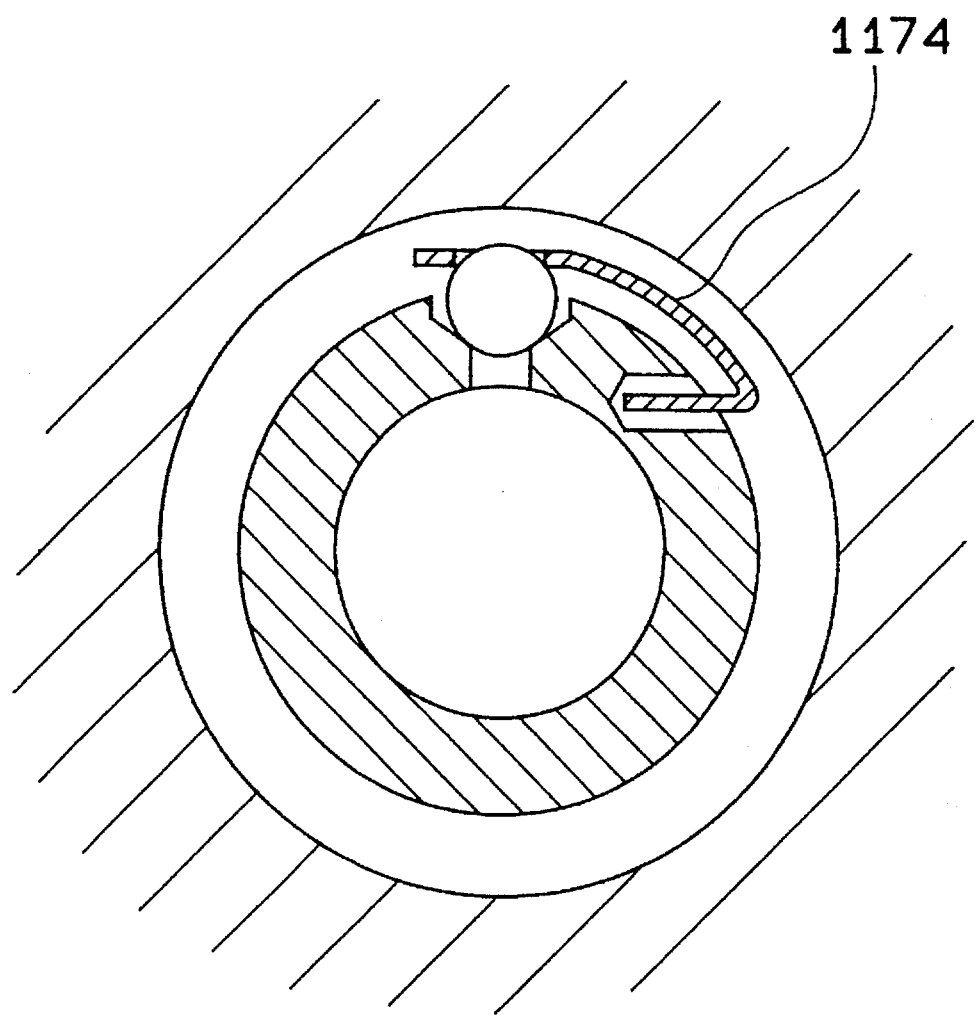
FIG. 17 shows further another modification of the embodiment.

Furthermore, as shown in FIG. 17, even in the case that a plate spring is used for the ring material, it is possible to shorten the length of this ring material 1174 which is the same as the structure shown in FIG. 15.

Figure 18:
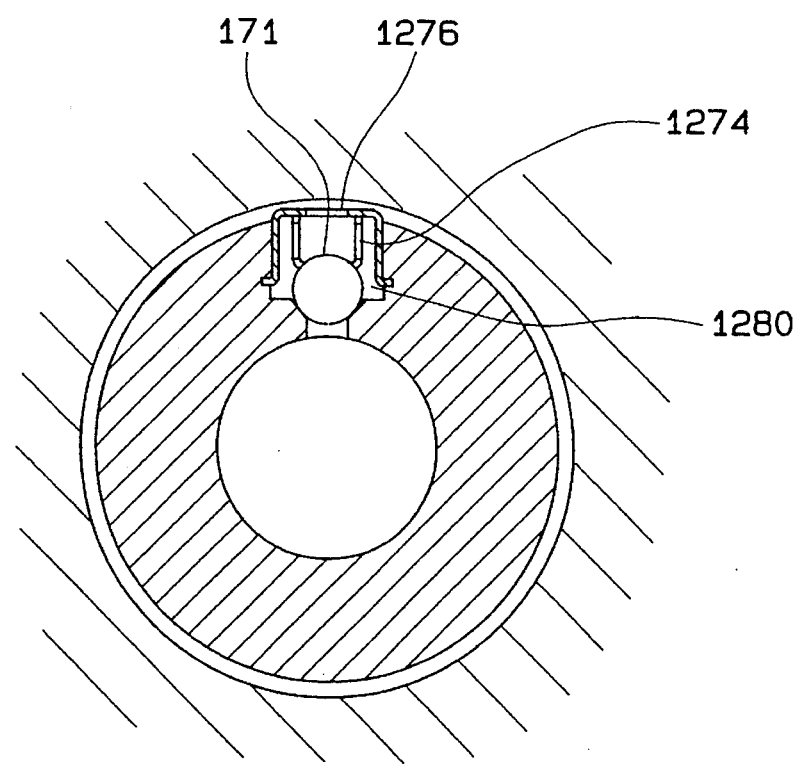
FIG. 18 shows still another modification of the embodiment.

Moreover, as shown in FIG. 18, it is possible to apply pressure to the ball needle 671 with a coil spring 1274. That is to say, by fixing the support member supporting the coil spring 1274 to the discharge groove 680, it is possible to substantially fix the fulcrum of the coil spring 1274 on the side of the cylinder member.

Figure 19:
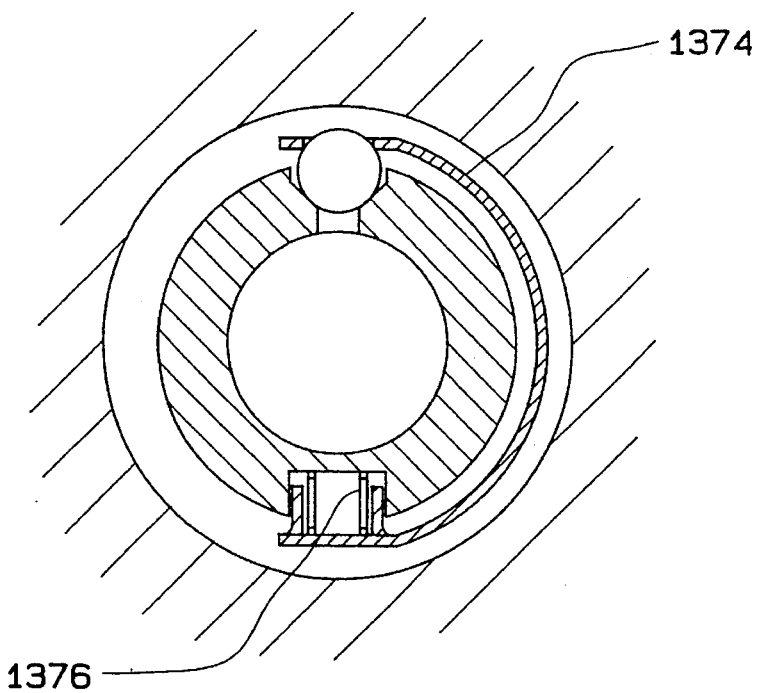
FIG. 19 shows further another modification of the embodiment.
Figure 20:
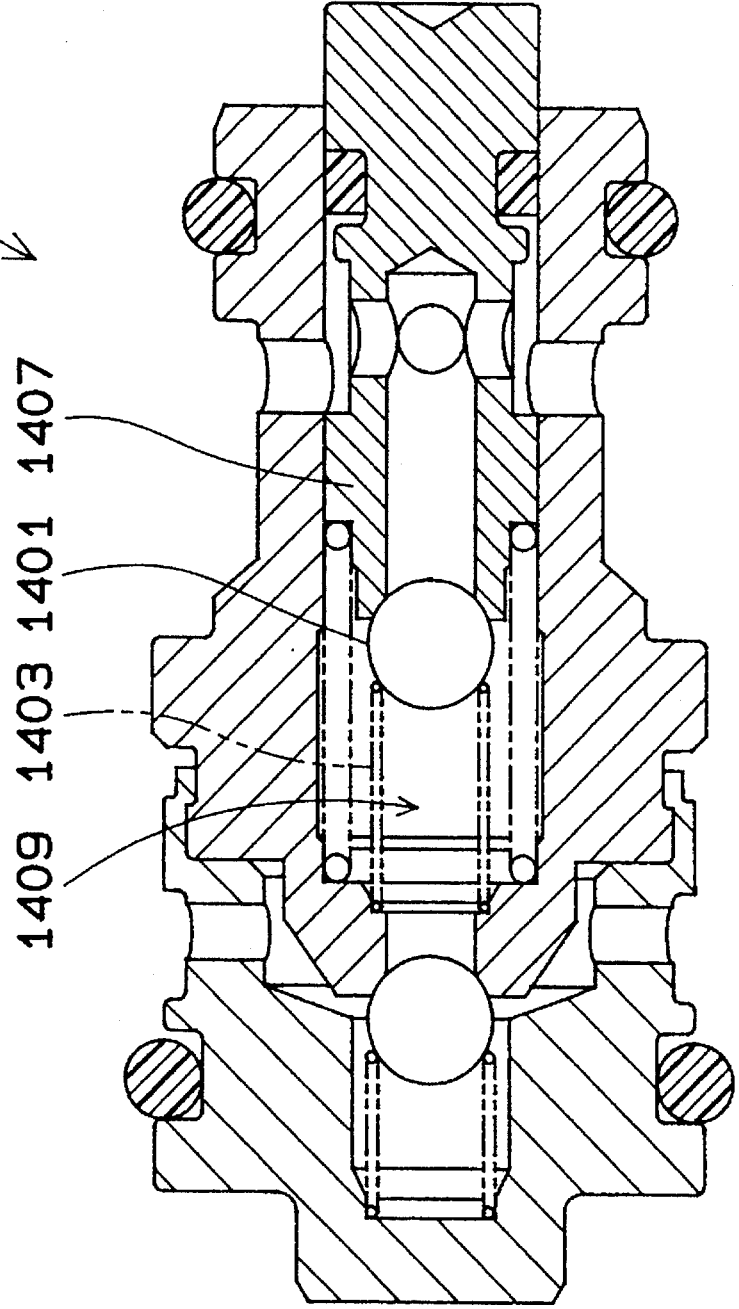
FIG. 20 is a cross sectional view of a piston pump of the prior art.

Still further, as is shown in FIG. 19, although it is structurally somewhat complex, it is possible to fix a plate 1374 which is a rigid body formed in a half-circular shape to the cylinder member while being supported by a coil spring 1376. According to this structure, it is possible to establish more space for installing the coil spring 1376 in comparison with the case that a coil spring is disposed on side of the ball needle 670.

As the described the above, the pump of the present invention suppresses a decrease in the volumetric efficiency of the pump to a great extent even in a case that the kinematic viscosity of a fluid is high, together with enabling a compact structure of the pump itself.

The present invention is described according to the first through the seventh embodiments, but the present invention is not exclusively limited to these embodiments, and can be executed in a various ways within a scope that does not departure from the essence of the present invention.

What is claimed is:

1. A pump provided with a first pump mechanism and a second pump mechanism, the pump comprising:

a housing having therein a first pump chamber, a second pump chamber, an intake port communicated with said first pump chamber, and a discharge port communicated with said second pump chamber;

first valve means disposed in a communicating passage between said first pump chamber and said second pump chamber, which opens said communicating passage when said second pump chamber is expanded and closes said communicating passage when said second pump chamber is compressed;

a piston reciprocatingly disposed in said housing, which expands said second pump chamber when said first pump chamber is compressed and compresses said second pump chamber when said first pump chamber is expanded in accordance with movement thereof;

second valve means disposed near said intake port in said housing, which opens so as to permit fluid to flow into said first pump chamber when said first pump chamber is expanded and closes so as to prevent fluid in said first pump chamber from flowing out of said first pump chamber when said first pump chamber is compressed; and third valve means disposed near said discharge port in said housing, which opens so as to discharge pressurized fluid in said second pump chamber when said second pump chamber is compressed and closes when said second pump chamber is expanded, wherein said second valve means is slidably disposed in said housing and engagable with said piston, said second valve means slides in accordance with the reciprocating movement of said piston, and thereby opens and closes said first pump chamber.

2. A pump according to claim 1, wherein said piston has first and second engagement portions and wherein said second valve means is in contact with said first engagement portion of said piston when said piston moves in a first direction, and is in contact with said second engagement portion of said piston when said piston moves in a direction opposite said first direction, and a gap is respectively formed between said second valve means and said first engagement portion of said piston when said second valve means is in contact with the second engagement portion of said piston.

3. A pump according to claim 8, wherein said third valve means is disposed in a direction perpendicular to movement of said piston.

4. A pump according to claim 3, wherein said third valve means includes a valve element and applying pressure means for applying pressure to said valve element toward a direction that said second pump chamber is closed, and said applying pressure means includes an engagement portion engaged to an outer wall of said second pump chamber and a movable portion for applying pressure to said valve element as a fulcrum with said engagement portion.

5. A pump according to claim 4, wherein said applying pressure means is an arc-shaped material along surface of said outer wall of said second pump, and one end of said ring material acts on said valve element and another end is engaged to said outer wall.

6. A pump provided with a first pump mechanism and a second pump mechanism, the pump comprising:

a housing having therein a first pump chamber, a second pump chamber, an intake port communicated with said first pump chamber, and a discharge port communicated with said second pump chamber;

first valve means disposed in a communicating passage between said first pump chamber and said second pump chamber, which opens said communicating passage when said second pump chamber is expanded and closes said communicating passage when said second pump chamber is compressed;

a piston reciprocatingly disposed in said housing, which expands said second pump chamber when said first pump chamber is compressed and compresses said second pump chamber when said first pump chamber is expanded in accordance with movement thereof;

second valve means disposed near said intake port in said housing, which opens so as to permit fluid to flow into said first pump chamber when said first pump chamber is expanded and closes so as to prevent fluid in said first pump chamber from flowing out of said first pump chamber when said first pump chamber is compressed; and third valve means disposed near said discharge port in said housing, which opens so as to discharge pressurized fluid in said second pump chamber when said second pump chamber is compressed and closes when said second pump chamber is expanded, wherein said piston has a second piston portion which reciprocates in accordance with said reciprocating movement of said piston, and wherein volume in said first pump chamber is compressed when said second valve means closes and is expanded when said second valve means opens in accordance with reciprocating movement thereof.

7. A pump according to claim 6, wherein said second valve means is engaged to said piston and slides in said housing in accordance with said reciprocating movement of said piston, thereby opening and closing said first pump chamber, and said second valve means slides so as to compress said volume in said first pump chamber.

8. A pump provided with a first pump mechanism and a second pump mechanism, the pump comprising:

a housing having therein a first pump chamber, a second pump chamber, an intake port communicated with said first pump chamber, and a discharge port communicated with said second pump chamber;

first valve means disposed in a communicating passage between said first pump chamber and said second pump chamber, which opens said communicating passage when said second pump chamber is expanded and closes said communicating passage when said second pump chamber is compressed;

a piston reciprocatingly disposed in said housing, which expands said second pump chamber when said first pump chamber is compressed and compresses said second pump chamber when said first pump chamber is expanded in accordance with movement thereof;

second valve means disposed near said intake port in said housing, which is engaged to said piston to be operated in accordance with said reciprocating movement of said piston, and opens so as to permit fluid to flow into said first pump chamber when said first pump chamber is expanded and closes so as to prevent fluid in said first pump chamber from flowing out of said first pump chamber when said first pump chamber is compressed; and third valve means disposed near said discharge port in said housing, which opens so as to discharge pressurized fluid in said second pump chamber when said second pump chamber is compressed and closes when said second pump chamber is expanded.

9. A pump according to claim 8, wherein said third valve means is disposed in a direction perpendicular to movement of said piston.

10. A pump according to claim 9, wherein said third valve means includes a valve element and applying pressure means for applying pressure to said valve element toward a direction that said second pump chamber is closed, and said applying pressure means includes an engagement portion engaged to an outer wall of said second pump chamber and a movable portion for applying pressure to said valve element as a fulcrum with said engagement portion.

11. A pump according to claim 10, wherein said applying pressure means is an arc-shaped material along surface of said outer wall of said second pump, and one end of said arc-shaped material acts on said valve element and another end is engaged to said outer wall.

12. A pump provided with a first pump mechanism and a second pump mechanism, the pump comprising:

a housing having therein a first pump chamber, a second pump chamber, an intake port communicated with said first pump chamber, and a discharge port communicated with said second pump chamber;

first valve means disposed in a communicating passage between said first pump chamber and said second pump chamber, which opens said communicating passage when said second pump chamber is expanded and closes said communicating passage when said second pump chamber is compressed;

a first piston reciprocatingly disposed in said housing, which expands said second pump chamber when said first pump chamber is compressed and compresses said second pump chamber when said first pump chamber is expanded in accordance with movement thereof;

a second piston engaged to said first piston and movable therewith and reciprocating with respect to said intake port and said first pump chamber, which compresses volume on a side of said intake port when expanding volume in said first pump chamber, expands volume on the side of said intake port when compressing volume in said first pump chamber, compresses volume in said first pump chamber when expanding volume in second pump chamber, and expands volume in said first pump chamber when compressing volume in said second pump chamber in accordance with reciprocating movement of said second piston;

second valve means disposed near said intake port in said housing, which opens so as to permit fluid to flow into said first pump chamber when said first pump chamber is expanded and closes so as to prevent fluid in said first pump chamber from flowing out of said first pump chamber when said first pump chamber is compressed; and third valve means disposed near said discharge port in said housing, which opens so as to discharge pressurized fluid in said second pump chamber when said second pump chamber is compressed and closes when said second pump chamber is expanded.

13. A pump according to claim 12, wherein said third valve means is disposed in a direction perpendicular to movement of said piston.

14. A pump according to claim 13, wherein said third valve means includes a valve element and applying pressure means for applying pressure to said valve element toward a direction that said second pump chamber is closed, and said applying pressure means includes an engagement portion engaged to an outer wall of said second pump chamber and a movable portion for applying pressure to said valve element as a fulcrum with said engagement portion.

15. A pump according to claim 14, wherein said applying pressure means is an arc-shaped material along surface of said outer wall of said second pump, and one end of said arc-shaped material acts on said valve element and another end is engaged to said outer wall.

* * * * *